United States Patent
White et al.

(10) Patent No.: US 7,263,457 B2
(45) Date of Patent: Aug. 28, 2007

(54) SYSTEM AND METHOD FOR OPERATING COMPONENTS OF AN INTEGRATED CIRCUIT AT INDEPENDENT FREQUENCIES AND/OR VOLTAGES

(75) Inventors: Scott A. White, Austin, TX (US); William A. Hughes, San Jose, CA (US); Philip E. Madrid, Round Rock, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 11/325,054

(22) Filed: Jan. 3, 2006

(65) Prior Publication Data
US 2007/0156370 A1     Jul. 5, 2007

(51) Int. Cl.
*G01K 1/08*     (2006.01)
(52) U.S. Cl. ..................... 702/132
(58) Field of Classification Search ................. 702/132
See application file for complete search history.

(56) References Cited

U.S. PATENT DOCUMENTS

| | | | |
|---|---|---|---|
| 6,901,303 B2* | 5/2005 | Larson et al. | 700/108 |
| 7,228,242 B2* | 6/2007 | Read et al. | 702/57 |
| 2003/0115013 A1* | 6/2003 | Dendinger | 702/132 |
| 2006/0161375 A1* | 7/2006 | Duberstein et al. | 702/132 |

* cited by examiner

*Primary Examiner*—John Barlow
*Assistant Examiner*—Jonathan Moffat
(74) *Attorney, Agent, or Firm*—Robert C. Kowert; Meyertons, Hood, Kivlin, Kowert & Goetzel, P.C.

(57) ABSTRACT

Multiple logic cores of integrated circuits and processors may be configured to operate at frequencies and voltages independently of each other. Additionally, other components, such as a common bridge configured to interface with the logic cores, may operate at a voltage and frequency independent of the voltage and frequency at which the logic cores are operating. The operating frequency and/or voltage of a logic core may be independently adjusted for various reasons, including power management and temperature control. Logic circuitry at an interface between the controller and the logic cores may translate logic signals from one voltage and/or frequency to another to enable communication between the bridge and the logic core when the two are operating at different voltages and/or frequencies.

32 Claims, 9 Drawing Sheets

SYSTEM AND METHOD FOR OPERATING COMPONENTS OF AN INTEGRATED CIRCUIT AT INDEPENDENT FREQUENCIES AND/OR VOLTAGES

BACKGROUND OF THE INVENTION

1. Field of the Invention

This invention is related to the field of integrated circuits, and more particularly to the operation of and communication between elements of an integrated circuit operating at independent frequencies and/or voltages.

2. Description of the Related Art

Typically, the regulation of operating voltage for integrated circuits, such as microprocessors, may be performed by circuitry located on the motherboard, external to the IC, due in part to requirements for large values of capacitance which may consume inordinate amount of real estate on an IC die. Power at the voltage level of the output of a voltage regulator may be supplied to the internal circuitry including the processor cores of the IC through several package pins. This may be done in part to reduce the current handling requirements for any given pin and/or traces leading thereto. Generally, the supply lines may be internally connected so that the cores and other elements operate at a common voltage level.

Typically, complex logic core designs produce large quantities of heat at certain points within the IC, esp. at high clock frequencies. The packaging of an IC along with the device and system cooling mechanisms may determine the maximum frequency at which the IC may operate without exceeding its specified maximum operating temperature at the points where heat generation is most pronounced. An IC manufacturer may specify a maximum package temperature for a specific device at which it will continue to function both correctly and reliably.

Since complex ICs such as microprocessors tend to be expensive, it is typically desirable to protect them from damage due to overheating. Temperature sensors are often located in various places within systems containing complex ICs to measure the ambient temperature at that position. Due to the method commonly used to incorporate complex ICs into systems such as soldering to a motherboard or socketing to a motherboard, and the direct attachment of heat sinks and/or other cooling apparatus to the chips, temperature sensors are generally found in locations other than the IC itself. Therefore, the temperature of the IC package must commonly be extrapolated from an actual temperature measurement at some point remote from the surface of the IC. The resulting case temperature estimate may be significantly above the actual temperature of the IC if conservative algorithms are used to perform the estimation.

A typical system may use the estimated package temperature of the IC to control power to the entire system or at least to the IC. For example, the output of the temperature sensor may be compared to a "trip point" value, and when this value is reached, a signal may be generated that causes the system power supply to shut down. Such a system may indeed protect the IC, but may also inconvenience the user who is frequently given no advanced warning that a shut down is forthcoming and who may have entered significant amounts of data without recently saving it to persistent storage. Also, as noted above, all such shut downs may not be necessary since the mechanism may activate based on a conservative estimate of the actual temperature of the chip.

To reduce the potential for user data loss, systems may employee a second trip point circuit configured to trigger at a temperature somewhat lower than the shut down temperature. In such a system, the lower temperature circuit may be used to initiate action that would inform the user that a system shutdown is imminent, and that he should take appropriate actions to secure any unprotected data. While this scheme may help protect user data, it may also produce a significant nuisance if temperatures wander into the range between trip points without actually reaching the shutdown point. In any case once the shutdown limit has been reached, the user is without the use of his system until such time that it cools down sufficiently and can be restarted.

SUMMARY

A processor or other integrated circuit may include multiple logic cores, each of which may be configured to operate at frequencies and voltages independently of the other logic cores, according to one embodiment of the present invention. In other words, each logic core of a processor may be configured to operate at a particular voltage and frequency regardless of whether other logic cores in the processor are also operating at the same voltage and/or frequency. The operating voltage and frequency of the logic cores in such a multi-core integrated circuit may be adjusted for various reasons, including power management and temperature management. For instance, one or more of the cores of a processor may be adjusted to operate at a lower frequency and/or voltage in order to save power in certain situations. Also, rather than simply shutting down a processor that is operating too warmly (as is generally done in the prior art), one or more of the logic cores in the processor may be adjusted to operate at a lower frequency and/or voltage so that the processor may generate less heat, and therefore may cool down to an acceptable operating temperature. For example, the processor, or other integrated circuit, may have a predetermined maximum operating temperature, above which the performance of the processor may be erratic or above which damage to the processor may potentially occur. If a current temperature for the processor is determined to be at, above, or near such a maximum operating temperature, one or more logic cores of the processor, or other integrated circuit, may be adjusted to operate at a lower frequency and/or voltage in order to lower the operating temperature of the processor.

Additionally, a processor or other integrated circuit may also include bridging, routing, or other common logic circuitry that may communicate or interface to the logic cores of the processor. For example, a Northbridge is a common component of many processors and may include separate interfaces to communicate with and route communication from multiple logic cores of an integrated circuit to other sub-systems, components or peripherals external to the integrated circuit. When multiple cores of a single processor are configured to operate at independent frequencies and voltages, such common bridge logic may be configured to communicate with each logic core using a different voltage level and/or clock frequency. Thus, adjusting voltages and frequencies used by common bridge logic may be included as part of changing the operating characteristics (i.e. voltage and frequency) of the logic cores in a multi-core integrated circuit. In addition, the common bridge logic may be configured to operate at voltages and frequencies independent of current operating voltages and frequencies of the logic cores. In other words, the common bridge logic may be configured to operate at a frequency and voltage different from any particular voltage or frequency at which the individual logic cores may be currently operating.

In some embodiments, an integrated circuit, such as a microprocessor, may include temperature sensors configured to determine and/or report the current operating temperature for the processor. In some embodiments, an integrated circuit may include multiple temperature sensors, such as one sensor for each of the logic cores, in order to provide individual or localized operating temperatures for various regions of the processor. For instance, in one embodiment it may be possible to reduce the operating voltage and/or frequency of a specific one of the multiple logic cores in order to reduce the temperature of a determined "hot spot" on the processor, based upon temperature measurements for various regions, such as for each individual logic core, of the processor. In other embodiments, however, only a single operating temperature may be measured for the integrated circuit as a whole, or alternatively, individual temperature measurements for different regions of the processor may be averaged or aggregated to determine a single, overall, operating temperature for the processor.

In some embodiments, the operating voltage and/or frequency of all of the logic cores of the processor may be reduced together, such as to lower the operating temperature of the processor or to reduce the overall power consumption of the processor. In other embodiments, the operating voltage and/or frequency for an individual logic core may be reduced. For example, when a higher than optimal operating temperature is detected for the processor, only one of multiple logic cores may be adjusted to operate at a lower voltage and/or frequency in order to reduce the overall operating temperature of the processor. If, in such an example, lowering the operating voltage and/or frequency of a single logic core does not reduce the overall operating temperature for the processor enough, the operating voltage and/or frequency for additional logic cores may be reduced in order to lower the operating temperature for the processor even more.

In another example, if the power consumption of an integrated circuit is higher than preferable, the operating voltage or frequency of a single one of the logic cores in the processor may be reduced in order to lower the overall power consumption of the processor. If required (or desired) the operating voltage and/or frequency for others of the logic cores may also be reduced, either at the same time or subsequently, in order to lower the overall power consumption even more. In some embodiments, the choice of which logic core to adjust or the order in which to reduce the operating voltage and/or frequency of multiple logic cores may be selected randomly. In other embodiments, however, the selection of which logic core should be adjusted to operate at a lower voltage and/or frequency may be based on other factors, such as the intended purpose of the logic core, or the location of the logic core within the processor, etc.

Since the operating frequency of a logic core is related to the operating voltage of that logic core, when an operating voltage for a logic core is adjusted, such as to lower the operating temperature, the operating frequency for the logic core may also be adjusted. For example, if the operating voltage of a logic core is reduced to a level incompatible with the current operating frequency, the operating frequency of the logic core may also be reduce accordingly.

In addition, when the operating voltage and/or frequency is adjusted for one or more logic cores in an integrated circuit, the operating frequency and/or voltage of a common bridge, interface, or other component that interfaces with the logic cores of the processor may also be adjusted, in some embodiments. For instance, if a common bridge interfaces with each of the logic controllers, a frequency and/or voltage for the common bridge, or just a portion of the common bridge, may be adjusted when the operating voltage and/or frequency of one of the logic cores is changed. In some embodiments, a single common bridge, such as a Northbridge, may be configured to interface with multiple logic cores of a processor or other integrated circuit, and the operating voltage and/or frequency of the common bridge may be adjusted so as to be compatible with the operating voltage and/or frequency of each of the elements it interfaces with.

For example, a common bridge may include multiple ports or interfaces, each of which may communicate with a different one of multiple logic cores of a processor and the operating frequency and/or voltage of each of the ports may be adjusted so as to be compatible with the operating voltage and/or frequency of respective logic core that the particular port communicates with, in one embodiment. In other embodiments, a single, overall operating voltage and/or frequency for a common bridge may be adjusted so as to be compatible with the operating voltages and/or frequencies of all the logic cores of the processor. For instance, the operating frequency of a controller may be adjusted to be higher than the current operating frequencies of all the logic cores in the processor. In some embodiments, the operating frequency of the controller may be adjusted to be an integer multiple of the operating frequency of one or more of the logic cores. In other embodiments, the operating frequency of the controller may be adjusted to be higher than, without necessarily being a multiple of, the operating frequency of the logic cores.

In some embodiments, a multi-core processor may also include circuitry configured to translate data and/or control signals communicated between a common bridge and one or more of the logic cores when the common bridge and logic cores are operating at different voltages and/or frequencies. For instance, the processor may include voltage translation circuitry configured to adjust the voltage level used for one or more communication signals or lines between the common bridge and a logic core of the processor. Additionally, the processor may, in some embodiments, include circuitry configured to translate data communicated between the common bridge and a logic core operating at different frequencies. In yet other embodiments, the logical protocol used when communicating between a common bridge interface and a logic core may be designed and/or configured to take into account a difference in frequency, and thus a difference in clock timings, for the communication between the common bridge interface and the logic core.

In some embodiments, a system including a multi-core processor, or other multi-core integrated circuit, including multiple logic cores, each configured to operate at voltages independently of each other, may also include one or more voltage regulators configured to supply a range of voltages to the logic cores of the processor. In one embodiment, such a system may include individual voltage regulators for each logic core of the processor. In other embodiments, however, the system may include only a single voltage regulator configured to deliver a range of voltages to the processor, but the system may also include circuitry configured to split and/or divide a single voltage signal from the voltage regulator and deliver individual voltage signals, which each may represent a different voltage, to different logic cores of the processor. In some embodiments, the voltage regulator and any voltage signal dividing and voltage translation circuitry may reside in, or be part of, the processor, while in other embodiments, the voltage regulator and any accompanying signal dividing or translation circuitry may be external to the processor. In yet additional embodiments, the voltage regulator or regulators may be external to the processor while some or all of any accompanying signal dividing or translating circuitry may be part of the processor.

Similarly, a system including an multi-core integrated circuit that includes multiple logic cores configured to operate at frequencies independently of each other may also include one or more clock signal generators configured to supply a range of clock or frequency signals to the processor either as part of or external to the processor. As with the voltage regulators and any accompanying signal dividing or adjusting circuitry discussed above, clock generators and accompanying signal dividing or translating circuitry may reside as part of, external to, or a combination of internal to and external to, the processor, according to various embodiments.

In some embodiments, the logic circuitry or firmware configured to control the operating voltage and frequency of logic cores and/or communication controllers may reside in the processor itself. In other embodiments, however, such circuitry or firmware may reside external to the processor but may be configured to interface with various elements in the processor, such as logic cores and/or a communication controller.

Figure 1:
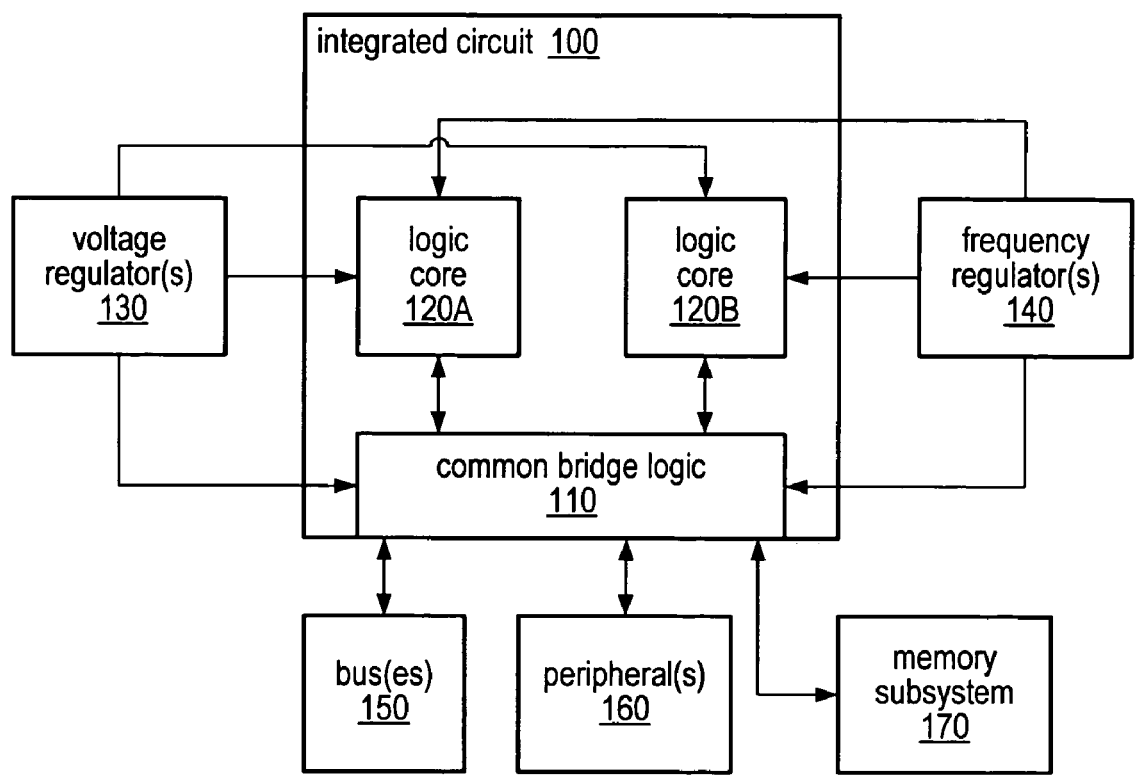
FIG. 1 is a block diagram illustrating an integrated circuit including multiple logic cores configured to operate at independent voltages and/or frequencies, according to one embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include" and derivations thereof mean "including, but not limited to." The term "connected" means "directly or indirectly connected," and the term "coupled" means "directly or indirectly coupled."

DETAILED DESCRIPTION OF EMBODIMENTS

Processors or other integrated circuits may include multiple logic cores configured to operate at independent voltage levels and frequencies. Additionally, a processor or integrated circuit may include a common bridge or interface unit configured to communicate with various elements of the processor, including one or more of the logic cores. Such a common bridge unit, interface unit, or other component configured to communicate with logic cores operating at independent voltages and/or frequencies may also be configured to communicate with elements external to the processor, such as memory, additional communications busses, and/or other peripherals. A system with one or more multi-core processors that each include multiple, independently controllable (as to operating voltage and frequency) logic cores may be configured to automatically adjust the operating voltage and/or frequency of one or more of the logic cores for power management or to control the operating temperature of the system.

For example, FIG. 1 is a block diagram illustrating a system that includes a multi-core integrated circuit 100, according to one embodiment. As noted above, an integrated circuit may include multiple logic cores, such as logic cores 120A and 120B each of which may be configured to operate at an independent voltage and frequency. In other words, each logic core may operate at a voltage and/or frequency independently from the voltage and/or frequency at which other logic cores, such as logic core 120B, may operate. While FIG. 1 depicts integrated circuit 100 including two logic cores, other embodiments may involve integrated circuits or multi-core processors that include additional logic cores. In some embodiments integrated circuit 100 may represent a multi-core processor and logic cores 120A and 120B may represent processor cores that execute instructions supplied to integrated circuit 100. In general the systems, methods and techniques described herein may be applied to systems or devices that include any number of logic cores configured to operate at independent voltages and/or frequencies. For example, a processor may include multiple logic cores, or processor cores, configured to operate at frequencies and voltages independently of each other, according to some embodiments. In other embodiments, an integrated circuit may include two or more logic cores that each may be configured to operate at frequencies and voltages independent of the frequencies or voltages that the other logic cores, or other components, may be operating.

Additionally, as illustrated in FIG. 1, a multi-core integrated circuit or processor may include a common bridge or interface unit, such as common bridge logic 110, configured to communicate with the logic cores as well as with other elements or peripherals either internal or external to integrated circuit 100, such as bus 150, peripheral 160 and/or memory subsystem 170. In some embodiments, common bridge logic 110 may be configured to operate at a voltage or frequency different from, and independent of, the voltages or frequencies at which the logic cores 120A and 120B are operating. In some embodiments, the voltage and frequency at which common bridge logic 110 operates may be related to, or dependent upon, the voltage and/or frequency at which the logic cores 120A and 120B operate. For instance, in some embodiments, common bridge logic 110 may always operate at a frequency at least as high as, and possible higher than, the highest frequency at which any of logic cores 120A and 120B may currently be operating. As the frequency at which a logic core operates is generally related to the voltage level at which the logic core operates, in some embodiments, the frequencies at which logic cores 120A and 120B operate may depend upon the voltage at which they operate.

Additionally, in some embodiments, a system including one or more multi-core integrated circuits may also include one or more voltage regulators, such as voltage regulator 130 configured to supply a range of voltages to the integrated circuit and, in some embodiments, may be configured to supply independent voltages to each logic core of the integrated circuit. In addition, in some embodiments, voltage regulator 130 may also supply a range of voltages to common bridge logic 110. Similarly, a system including one or more multi-core integrated circuits may also include one or more frequency regulators, such as frequency regulator 140, configured to supply clock frequency signals to logic cores, such as logic cores 120A and 120B. In some embodiments, frequency regulator 140 may also be configured to provide clock frequency signals to common bridge logic 110. Frequency regulator 140 may include any of various sorts of clock sources, such as an oscillator or phase locked loop (PLL) to generate a reference clock signal. Additionally, in some embodiments, frequency regulator 140 may include clock trees or other circuitry configured to split or divide a clock signal into multiple individual signals and may include multiple clock sources in order to supply multiple, independent clock signals of different frequencies.

In some embodiments, a common bridge, interface unit, or other common bridging logic, such as a Northbridge, may be controlled by a separate voltage regulator and/or frequency generator. According to some embodiments, allowing a common bridge that interfaces to multiple logic cores to operating at a voltage and/or frequency independent from each of the logic cores may allow the cores to operate at a lower voltages and frequencies while operating the common bridge at a higher voltage and/or frequency than the logic cores, thereby minimizing any potential bottlenecking at the common bridge. By allowing the common bridge to operate at a higher frequency that the cores may also allow the common bridge to communicate with each core at the core's respective frequency by communicating at a frequency that is a divider of the main operating frequency of the common bridge, thereby preventing the need to supply multiple frequencies to the common bridge.

Frequency regulator 140 may be configured to supply one or more voltages to common bridge logic 110, according to some embodiments. For instance, common bridge logic 110 may be configured to interface with each of the logic cores 120 in integrated circuit 110 and thus may be supplied, such as from voltage regulator 130, with one or more voltages. Similarly, in some embodiments, frequency regulator 140 may be configured to supply one or more frequency or clock signals to common bridge logic 110. Common bridge logic 110 may be configured to interface with a logic core using the same logic levels and/or clock timing as the logic core and thus, may be supplied with multiple voltages and/or frequencies in order to allow common bridge logic 110 to communicate with each logic core using individual voltages and clock timings with each respective logic core. Alternatively, in some embodiments, common bridge logic 100 may be configured to receive only a single voltage and/or a single frequency signal. In such embodiments, common bridge logic 110 may be configured to interface with an individual logic core even though the logic core may be operating at a different voltage level or at a different frequency than common bridge logic 110. For instance, common bridge logic 110 may be supplied with a voltage that is at least as high as the voltage of logic core 120A and may similarly be supplied with a frequency or clock signal at least as fast as the current operating frequency of logic core 120A and the interface between common bridge logic 110 may be configured to translate the communication, such as the signals on one or more control lines, between the different logic levels and/or between the different frequencies between common bridge logic 110 and logic core 120A.

In one embodiment, each logic core 120 and common bridge logic 110 may receive a respective supply voltage and clock independent from one another. For example, a number of different voltages may be generated and/or regulated and input to integrated circuit 100 through various connections. Alternatively, a single voltage may be input to integrated circuit 100 and modified internally to produce the required voltages. Likewise, multiple clock signals at differing frequencies may be generated either off-chip or internally and coupled to individual logic cores 120 and/or common bridge logic 110. In one embodiment, a clock signal at a single frequency may be coupled to logic cores 120 and each core may generate a specific internal operating frequency derived from this signal.

While the above discussion refers to independently controlling the operating voltages and/or frequencies for multiple logic cores in a multi-core processor, according to some embodiments, the systems, methods and techniques described herein for independently controlling operating voltages and/or frequencies may be applied to any integrated circuit or component that includes multiple areas or sections of circuitry configured to operate at independent operating voltages and/or frequencies. For instance, a controller, bridge or other components configured to interface to, or communicate with multiple components may be configured to independently control the frequency and or voltages of those interfaces. Additionally, the methods, techniques and system described herein may be applied to independently control the operating voltages and/or frequencies at which different portions of a single circuit or even a group of interfaced components in response a changing operating temperature for the circuit or group of components.

Figure 2A:
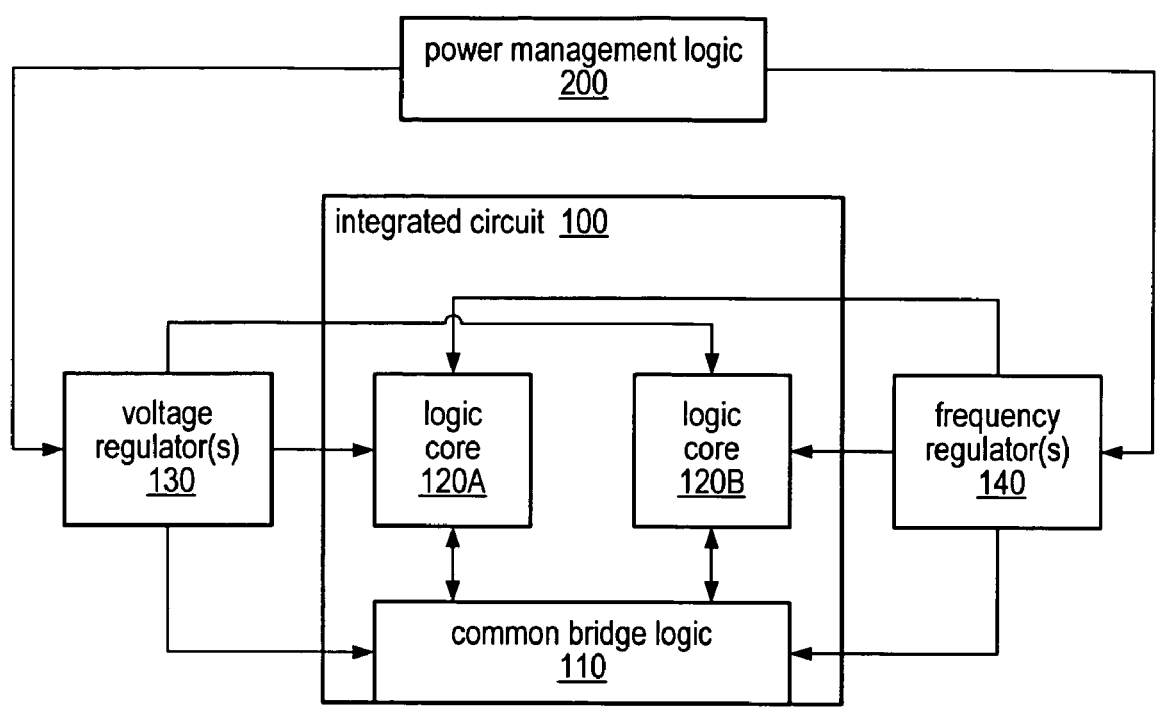
FIG. 2A is a block diagram illustrating one embodiment of a multi-core integrated circuit in which the operating voltages and/or frequencies for each of multiple logic cores are controlled by power management logic.

FIG. 2A illustrates a block diagram representing one embodiments of a system including multi-core integrated circuit 100. In the embodiment illustrated by FIG. 2A, power management logic 200 may be configured to control the operating characteristics, such as the operating voltage and/or operating frequency, of each of multiple logic cores 120 of integrated circuit 110. For example, FIG. 2A may represent part of the circuitry for a battery powered computing device, such as a laptop, handheld computer, or PDA, that may include power management logic 200. In such an example, power management logic 200 may be configured to adjust the operating characteristics, such as the operating voltage and/or frequency for one or more of the multiple logic cores 120 of integrated circuit 100 in order to adjust the overall power consumption for integrated circuit 100. For instance, in one embodiment, power management logic 200 may be configured to lower the operating characteristics of one or more of the logic cores 120 when the system is operating on battery power and may be also be configured to raise the operating characteristics of one or more of the logic cores 120 when the system is not operating on batter power. In other words, if the system is operating on battery power, power management logic 200 may be configure to adjust the operating frequency and/or voltage for one or more of the logic cores of integrated circuit 100 to lower levels in order to reduce the overall power consumption of integrated circuit 100. In one embodiment, power management logic 200 may be configured to adjust the operating frequency and/or voltage of the logic cores of a multi-core processor, or other multi-core integrated circuit as part of other system-level power saving methods and techniques, such as reducing the brightness of a laptop display, shutting down wireless communication interfaces and CDROM or DVD drives.

In some embodiments, power management logic 200 may be configured to adjust the operating characteristics for one logic core to a lower level than the operating characteristics of another logic core depending upon the overall power consumption or depending upon the specific nature of the system. Additionally, in some embodiments, power management logic 200 may be configured to adjust the voltages and/or frequencies supplied to common bridge logic 110. In one embodiment, power management logic 200 may adjust the voltages and/or frequencies supplied to common bridge logic 110 in step with the operating voltages and/or frequencies of the logic cores. In other embodiments, however, power management logic 200 may be configured to supply higher voltages and/or frequencies to common bridge logic 110 than to the logic cores. For example, in one embodiment, logic cores 120A and 120B may consume significantly more power than common bridge logic 110, while at the same time, common bridge logic 110 may be more of a bottleneck to overall performance than any individual logic core (since common bridge logic 110 may interface and communicate with multiple logic cores and other elements, interfaces and components). In such an example, power management logic 220 may be configured to supply a higher voltage and frequency to common bridge logic 110 to reduce any potential bottlenecking of common bridge logic 110, and therefore to help maintain a high overall performance, while supplying lower voltages and frequencies to the individual logic cores 120 to reduce overall power consumption.

In one embodiment, a logic core 120 may be configured to change its operating frequency in response to a request from power management logic 200. For example, power management logic 200, may determine that logic core 120A is consuming power in excess of that allocated to it for a particular mode of system operation. In response to this determination, the power management logic 200 may issue a request to the logic core 120A to alter its frequency of operation. In one embodiment, the logic core may generate its internal clock using a phase-locked loop (PLL) locked to an externally provided clock signal, such as may be provided by frequency regulator 140. The internal operating frequency of the logic core may be a multiple of that of the external clock signal as determined by configuration parameters of the PLL. The PLL configuration parameters may be alterable by writing to one or more control registers, thus setting the internal operating frequency of the logic core. Each logic core of integrated circuit 100 may include a corresponding set of control registers through which its PLL configuration parameters may be set, according to some embodiments. Thus, in some embodiments, power management logic 200 may write to one or more control registers of integrated circuit 100 to adjust the operating frequency of one or more logic cores 120.

As illustrated in FIG. 2A, power management logic 200 may be coupled to, or otherwise interfaced to, voltage regulator 130 and frequency regulator 140 in order to adjust the operating voltages and frequencies for the logic cores 120 and/or for common bridge logic 110. Thus, when adjusting the operating characteristics for logic core 120A, power management logic 200 may be configured to communicate, such as via one or more control signals, with voltage regulator 130 to instruct voltage regulator 130 to supply a particular voltage to logic core 120A. Similarly, power management logic 200 may be configured to communicate with frequency regulator 140 to instruct frequency regulator 140 to supply a particular frequency or clock signal to logic core 120A.

In some embodiments, power for each logic core 120 and/or common bridge logic 110 may be supplied through circuitry that is isolated from that which supplies power to the other logic cores within integrated circuit 100. In this configuration, each logic core 120 and/or common bridge logic 110 may be operated at an independent voltage level that is different from the voltage levels at which other logic cores are operated. One or more voltage regulators, such as voltage regulator 130, may be configured to supply voltage to each logic core 120 and/or common bridge logic 110 at a different level. Each voltage regulator supplying power to a portion of the IC 100 may be configured to receive requests to output power at one or more voltage levels and to adjust the voltage levels of its outputs in response to such a request. In one embodiment, logic cores 120 may be configured to issue such requests. For example, power management logic 200 may be configured to request voltage regulator 130 to change the voltage level supplied to one or more logic cores 120. Power management logic 200 may be configured to determine the current output voltage levels for a logic core 120 by accessing data stored in configuration registers for voltage regulator 130. Alternatively in other embodiments, a core that detects that it is operating at a certain temperature may request that the voltage regulator supplying its power change the supplied voltage level.

When adjusting the operating characteristics for a logic core 120 (or for common bridge logic 110) power management logic 200 may be configured to determine a new target voltage. For example, in order to reduce the overall power consumption of integrated circuit 100, power management logic 200 may determine a new operating voltage for logic core 120A and/or logic core 120B. Since, as noted above, the operating frequency for a logic core may be dependent upon a minimum operating voltage, power management logic 200 may be configured to determine whether the current operating frequency for a logic core is feasible, desirable, or compatible with the new operating voltage. If the current operating frequency for logic core 120A is not compatible with or feasible at the new operating voltage for logic core 120A, power management logic 200 may be configured to determine a new operating frequency in light of the new voltage. For example, power management logic may be configured to access a table of compatible or desirable voltage-frequency pairs for use when adjusting the operating characteristics for logic cores.

Similarly, power management logic 200 may be configured to first determine a new operating frequency for a logic core when adjusting the operating characteristic for the logic core. Thus, in some embodiments, power management logic 200 may be configured to determine a new desired operating frequency for logic core 120A and then determine whether the desired frequency is compatible with, or feasible at, the current operating voltage for logic core 120A. For instance, power management logic 200 may be increasing the operating frequency for logic core 120A, such as in response to determining that a system including integrated circuit 100 is no longer operating on battery power. If a desired operating frequency for logic core 120A is not compatible with the current operating voltage for logic core 120A, power management logic 200 may be configured to determine and new operating voltage for logic core 120A that is compatible with the desired operating frequency. Alternatively, power management logic 200 may be configured to select a different desired frequency that is compatible with the current operating frequency of logic core 120A, according to one embodiment.

As when adjusting the operating characteristics for logic cores, power management logic 200 may be configured to ensure that new frequencies and voltages are compatible with each other when adjusting the frequencies and/or voltages supplied to common bridge logic 110. As noted above, common bridge logic 110 may be supplied with one or more voltages and one or more frequencies, according to various embodiments. As noted above, common bridge logic 110 may be configured to communicate or interface with each logic core 120 using different voltages and/or frequencies for each logic core, depending upon the individual operating characteristics of each logic core. Thus, in some embodiments, power management logic 200 may be configured to instruct voltage regulator 130 to supply multiple, independent voltage levels to common bridge logic 110. Power management logic 200 may be configured to select the voltage level for each voltage signal supplied to common bridge logic 110, according to some embodiments. In other embodiments, however, power management logic 200 may be configured to control the voltages supplied to the individual logic cores and rely upon common bridge logic 110 to coordinate with voltage regulator 130 to receive the appropriate voltages necessary to communicate with each logic core. Similarly, in some embodiments, power management logic 200 may be configured to control the frequency of individual clock signals supplied by frequency regulator 140 to common bridge logic, while in other embodiments, common bridge logic 110 may be configured to determine the particular frequencies required to communicate with each logic core and coordinate with frequency regulator 140 to receive one or more clock signals at appropriate frequencies.

Thus, various portions of the logic required to control the voltages and frequencies supplied to common bridge logic 110 may reside in power management 200, voltage regulator 130, frequency regulator 140 and/or common bridge logic 110, according to various embodiments.

Figure 2B:
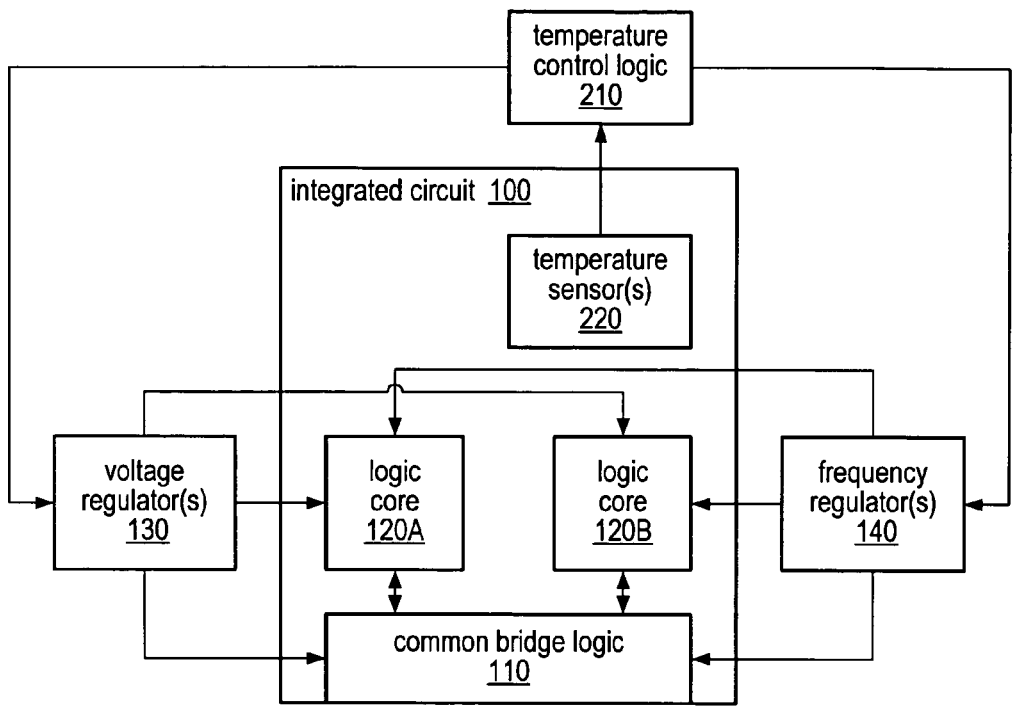
FIG. 2B is a block diagram illustrating temperature control logic configured to adjust the operating voltages and/or frequencies for logic cores of a multi-core integrated circuit, according to one embodiment.

FIG. 2B illustrates one embodiment of a multi-core integrated circuit for which the operating characteristics (i.e. operating voltage and frequency) for each of multiple logic cores may be controlled by temperature control logic. In some embodiments, integrated circuit 100 may include one or more temperature sensors, such as temperature sensor 220, configured to measure the operating temperature of integrated circuit 100. For example, in some embodiments, temperature sensor 220 may represent a thermal diode. Temperature sensor 220 may, in one embodiment, be incorporated into the die of integrated circuit 100 in proximity to an element of integrated circuit 100 that generates the most heat during normal operation. In another embodiment, multiple temperature sensors 220 may be incorporated into integrated circuit 100 near corresponding logic cores. Alternatively, in other embodiments, temperature sensor 220 may not be incorporated into integrated circuit 100, but may be next to, adjacent to, or coupled to integrated circuit 100 such that it may measure an operating temperature for integrated circuit 100. Such measurements of operating temperature indications may be used to request adjustments to core operating frequencies and voltages, as detailed below.

In one embodiment, temperature sensor 220 may be configured to measure an overall operating temperature of the entire integrated circuit 100, while in other embodiments, temperature sensor 220 may be configured to measure a local operating temperature for a portion of integrated circuit 100, such as a local operating temperature for logic core 120A or logic core 120B. A temperature sensor 220 may provide an indication of the temperature of the hottest portion of an associated IC element in some embodiments, while in others it may provide an indication of the average temperature of the element. In yet other embodiments, integrated circuit 110 may include more than one temperature sensor 220, each configured to measure a local operating temperature for an individual area or region of integrated circuit 100. Thus, in some embodiments, individual temperature measurements may be taken corresponding to each logic core in integrated circuit 100. In other embodiments, however, integrated circuit 100 may not include a temperature sensor 220, but the system of which IC 100 is a part may include a thermal sensor external to integrated circuit 100 that may be configured to measure or otherwise determine an operating temperature for integrated circuit 100.

In one embodiment, a request to change the operating voltage and/or frequency of an IC component, such as logic cores 120, may be generated in response to a change in the operating temperature of the component. For instance, temperature control logic 210 may be configured to read a current operating temperature for integrated circuit 100 and request a change in the current operating voltage and/or frequency of one or more logic cores 210. The logic cores 120, common bridge logic 110, and/or other components included in the IC may have an associated temperature sensor 220. In one embodiment, temperature sensor 220 may generate a control signal or interrupt in response to detecting a specified temperature or temperatures. In other embodiments, the temperature sensor 220 may provide an indication of the temperature of the associated component on a continual basis. As temperature sensors and other devices configured to measure operating or ambient temperatures, as well as methods and techniques for interfacing with such devices to read, collect, record, or measure temperatures are well understood in the art, they will not be discussed in detail herein.

In some embodiments, the operating temperature of integrated circuit 100 may be higher than a maximum, preferred, or otherwise specified operating temperature for integrated circuit 100, above which incorrect, unpredictable or unreliable operation may occur. For instance, an IC manufacturer may specify a temperature range in which the IC may function properly for an indefinite period of time. This temperature range may include a maximum temperature beyond which proper functionality is not assured and damage to the device may result. As described herein, one method of reducing the operating temperature of an IC may be to decrease the operating frequency and/or voltage of the components included in the device. In some embodiments, temperature control logic 210 may be configured to protect the operational integrity of integrated circuit 100.

Thus, in some embodiments, logic circuitry, firmware, and/or software, either internal or external to integrated circuit 100, such as temperature control logic 210, may be configured to monitor the operating temperature of integrated circuit 100. In various embodiments, temperature control logic 210 may be implemented in hardware, software, firmware, or a combination thereof. Temperature control logic 210 may be configured to automatically reduce the operating frequency and/or voltage of one or more logic cores in integrated circuit 110 in response to detecting or determining that integrated circuit 100, or an individual logic core 120 of integrated circuit 100, is operating at a temperature higher than a maximum, safe, preferred, or otherwise specified operating temperature. Temperature control logic 210 may, in some embodiments, be configured to access, interface with, or otherwise communicate with temperature sensor(s) 220 to determine a current operating temperature for integrated circuit 100 or for one or more logic cores in integrated circuit 100, such as logic cores 120A and 120B.

If temperature control logic 210 determines that the operating temperature of integrated circuit 100 is too high, temperature control logic 210 may be configured to automatically adjust the operating voltage and/or frequency of one or more logic cores of integrated circuit 100, such as logic core 120A or logic core 120B or both, according to different embodiments. For example, after determining that integrated circuit 100 is operating at a temperature higher than a specified operating temperature, temperature control logic 210 may configure logic core 120 to operate at a lower voltage and/or frequency in order to reduce the operating temperature of integrated circuit 110. As with power management logic 200, described above, temperature control logic 210 may, in some embodiments be configured to communicate or interface with voltage regulator 130 and frequency regulator 140 in order to adjust the voltages and frequencies supplied to logic cores 120A and 120B.

In some embodiments, temperature control logic 210 may reduce the operating frequency and/or voltage of all the logic cores in integrated circuit 100 at the same time. In other embodiments, however, temperature control logic 210 may initially reduce the operating voltage and/or frequency for a single logic core, such as logic core 120A, but may reduce the operating voltage and/or frequency for additional logic cores, such as logic core 120B, if the operating temperature for integrated circuit 100 does not become low enough after reducing the operating voltage and/or frequency of just one logic core. Accordingly, temperature control logic 210 may be configured to monitor, either continually or periodically, the operating temperature of integrated circuit 100 to determine whether a reduction in the operating characteristics, such as reducing the operating voltage and/or frequency of one or more logic cores in integrated circuit 100 results in a low enough operating temperature for integrated circuit 100. Please note that the term "operating characteristics", is used herein to refer to an operating voltage or an operating frequency, or both.

If, after reducing the operating characteristics for one or more logic cores 120 in integrated circuit 100, temperature control logic 210 determines that the operating temperature for integrated circuit 100 is still too high, temperature control logic may be configured to make an additional reduction in the operating characteristics for one or more logic core within integrated circuit 100, according to some embodiments. For instance, temperature control logic 210 may initially reduce the operating characteristics of logic core 120A and subsequently reduce the operating characteristics of logic core 120B after determining that the reduction in the operating characteristics for logic core 120A did not lower the operating temperature for integrated circuit 100 enough. Alternatively, in some embodiments, if the operating temperature of integrated circuit 100 is not low enough after reducing the operating characteristics of both logic cores 120A and 120B, temperature control logic 210 may reduce even further the operating characteristics for either logic core 120A or 120B or both. Thus, in some embodiments, temperature control logic 210 may be configured to reduce the operating characteristics for one or more of the logic cores in a multi-core processor in steps or stages until a desired or optimal operating temperature for integrated circuit 100 results.

Figure 2C:
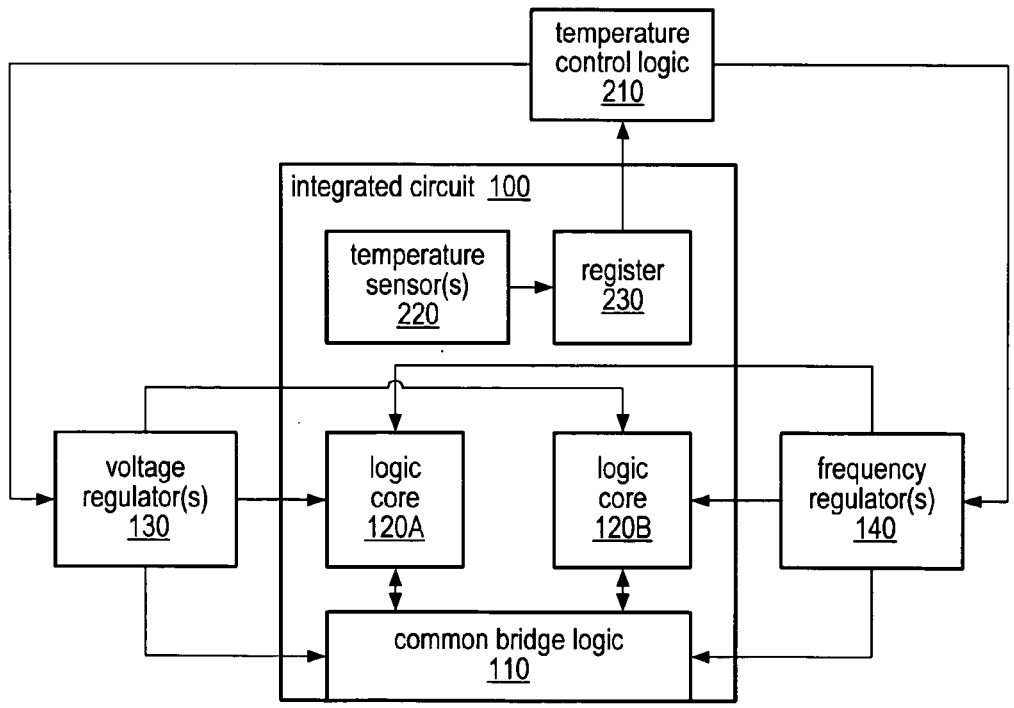
FIG. 2C is a block diagram illustrating temperature control software configured to adjust the operating voltages and/or frequencies for logic cores of a multi-core integrated circuit, according to one embodiment.

Regarding FIG. 2C, in one embodiment, temperature sensor 220 may be configured to periodically store a current operating temperature for processor 100 in register 230 within processor 100 and temperature control logic 210 may be configured to access register 230 to determine the current operating temperature for processor 100. In some embodiments, temperature sensor(s) 220 may be configured to store multiple temperature measurements, each corresponding to an operating temperature for a different one of multiple logic or processor cores in IC 100, using multiple registers or other data storage locations within, or external to, IC 100. Please note that in some embodiments, temperature control logic 210, and power management logic 200 may both be part of a single set of logic, implemented in hardware, firmware, software, or a combination thereof, that is configured to monitor and adjust the operating frequency and/or voltage of various portions of integrated circuit 100, such as the logic cores 120 and common bridge logic 110.

While the discussion above refers to reducing the operating characteristics for one or more logic cores in order to reduce the operating temperature or for power management reasons, the operating characteristic for one or more processor cores may be adjusted individually for other reasons. For instance, in some embodiments, the operating voltage and/or frequency of a individual logic core may be adjust independently of any other logic cores in a multi-core processor in order for that logic core to interface with or to a particular device or circuit at a particular voltage or speed while allowing another logic core of the same processor to operate at a different voltage and/or frequency. In general the devices, methods and techniques described herein may be utilized for adjusting the operating characteristics of logic cores in a multi-core environment independently for any number of reasons.

Figure 3:
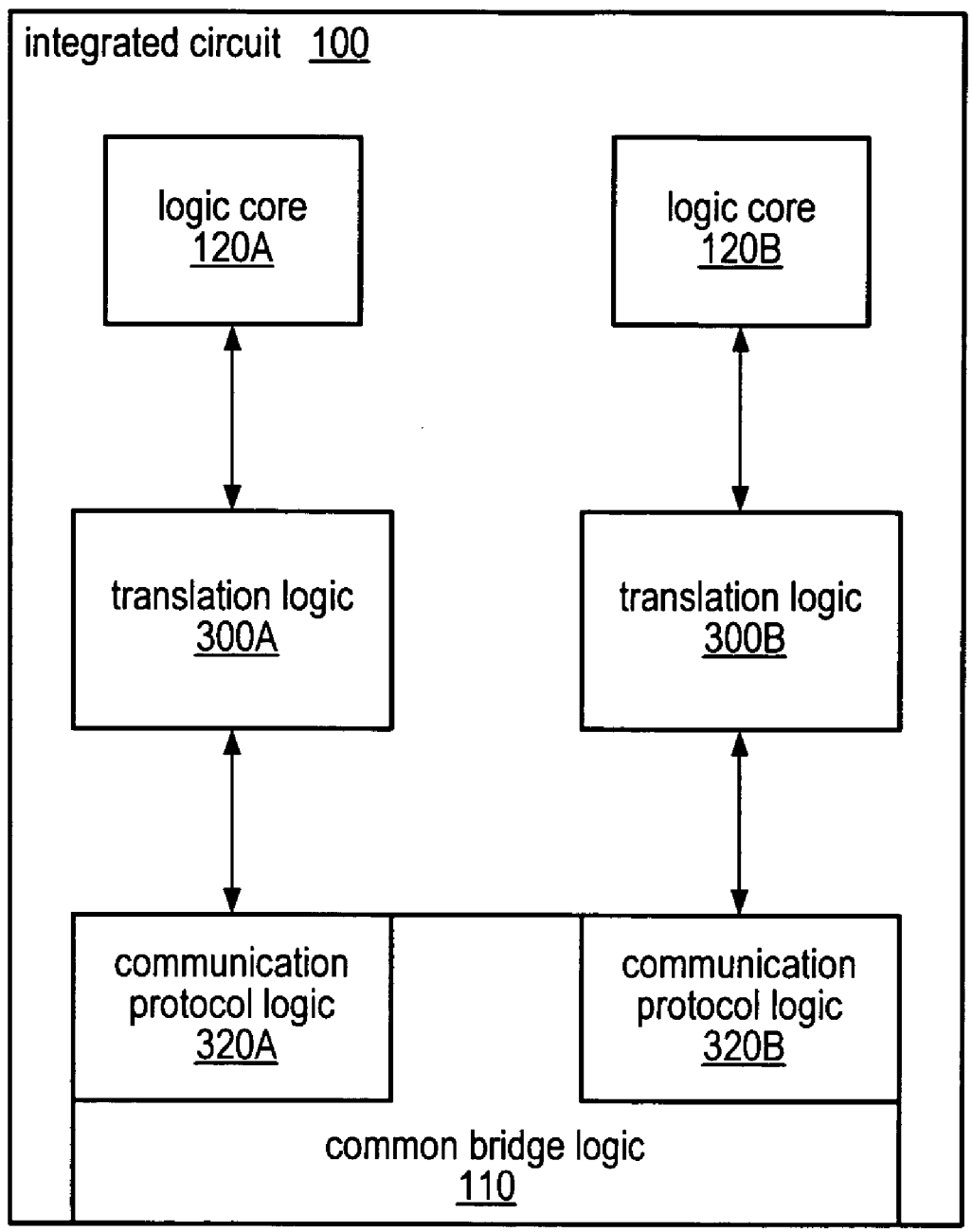
FIG. 3 is a block diagram illustrating, according to one embodiment, a multi-core integrated circuit including voltage and/or frequency translation logic.

As noted above, multiple logic cores in a multi-core integrated circuit, such as logic cores 120A and 120B of integrated circuit 100 may communicate or interface with common bridge logic 110, according to some embodiments. FIG. 3 is a block diagram illustrating one embodiment of an integrated circuit in which logic cores 120A and 120B communicate with common bridge logic 110 using translation logic and communication protocol logic. Since, as noted above, each logic core of a multi-core integrated circuit may be configured to operate at a voltage and/or frequency independent of the other logic cores, common bridge logic 110 may be configured to communicate with each logic core at an individual voltage and/or frequency. Thus, common bridge logic 110 may include multiple sets of communication protocol logic 320, such as communication protocol logic 320A and 320B, in order to communicate with different logic cores at independent voltages and frequencies. In some embodiments, the particular logical protocol implemented by communication protocol logic 320 may be configured to account for differences in clock timings in the communication with a logic core due to differences between the operating frequency of the logic core and the operating frequency of common bridge logic 110 and/or the operating frequency of communication protocol logic 320A. For example, communication protocol logic 320A may be configured to anticipate a longer delay when expecting communication signals from logic core 120A if/when logic core 120A is operating at a frequency that is slower than a frequency at which communication protocol logic 320A and/or common bridge logic 110 may be operating.

Additionally, in some embodiments, integrated circuit 100 may include translation logic at the interface(s) between logic cores 120 and common bridge logic 110. In some embodiments, such translation logic is configured to translate the voltage logic levels between the different voltages of logic cores 120 and common bridge logic 110. For example, if logic core 120A is operating at one voltage while common bridge logic 110 and/or communication protocol logic 320A is operating at a different voltage, translation logic 300A may be configured to translate the interface signals between the two logic levels. Similarly, translation logic 300B may be configured to translate the logic levels of signals between communication protocol logic 320B and logic core 120B if/when logic core 120B and communication protocol logic 320B are operating at different voltages.

In some embodiments, translation logic may be configured to adapt, adjust or translate the interface signals between common bridge logic 110 and logic cores 120 to account for differences between the operating frequencies of common bridge logic 110 and logic cores 120. In some embodiments, communication protocol logic 320A may be configured to operate at a frequency independent of a frequency at which the remainder of common bridge logic 110 operates.

Figure 4:
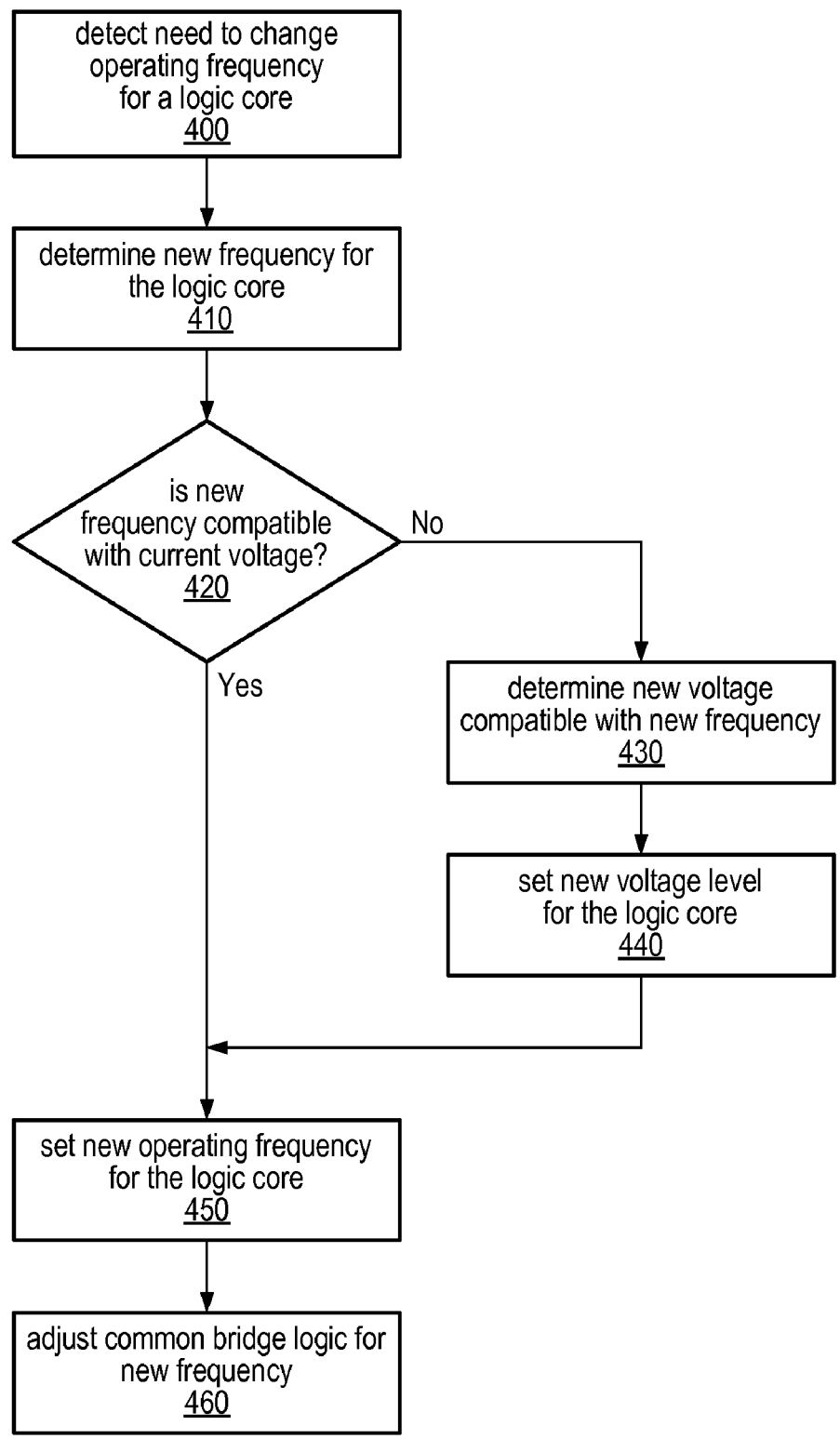
FIG. 4 is a flowchart illustrating one embodiment of a method for independently adjusting the operating frequency for logic cores of a multi-core integrated circuit, according to one embodiment.

FIG. 4 is a flowchart illustrating one embodiment of a method for independent power management of one or more logic cores, according to one embodiment. As noted above, the operating characteristics, such as operating voltage and frequency, for multiple logic cores may be controlled independently for various reasons. A system including multiple logic cores may detect a need to change the operating frequency for a logic core, as illustrated by block 400. For example, in one embodiment, power management logic 200 may detect a low power state and may attempt to reduce the operating frequency for one or more logic cores of a multi-core processor to reduce the overall power consumption of the system. In another embodiment, a system including a multi-core processor may be operating from battery power and power management logic 200 may be configured to detect when the system is operating on battery power and adjust the operating frequency of one or more of the logic cores. Additionally, power management logic 200 may be configured to detect when the system transitions from battery power to wall power and adjust the operating frequency of one or more logic cores to a higher frequency to take advantage of the fact that the system is no longer on battery power.

Additionally, in some embodiments, a system may include temperature control logic 210 that may be configured to adjust the operating temperature of one or more logic cores. For instance, temperature control logic 210 may be configured to monitor the operating temperature for a multi-core processor and/or for individual logic cores of a multi-core processor. As noted above, a multi-core integrated circuit may include a temperature sensor 220 via which temperature control logic 210 may monitor operating temperature. As noted above, if the operating temperature for either an individual logic core, or for the entire integrated circuit, is above a preferred, maximum, or safe, operating temperature, temperature control logic 210 may be configured to reduce the operating frequency for one or more of the logic cores of the multi-core integrated circuit in order to reduce the overall operating temperature of the system. Additionally, in some embodiments, temperature control logic 210 may be configured to raise the operating frequency for one or more logic cores in response to determining an operating temperature below a specified operating temperature. Thus, in some embodiments, the operating frequency for a logic core may be adjusted to a lower frequency, while in other embodiments a logic core may be adjusted to operate at a higher frequency.

In some embodiments, temperature control logic 210 may be configured to raise an operating frequency for a logic core only if the operating frequency for the logic core was reduced previously. For instance, the operating frequency for logic core 120A may, upon system startup, be initially set to a specified maximum operating frequency and temperature control logic 210 may only raise the operating frequency for logic core 120A if the operating frequency for logic core 120A has been lowered from the initial frequency. Similarly, when raising the operating frequency for a logic core, power management logic 200 and/or temperature control logic 210 may be configured to only raise the operating frequency to a specified maximum frequency regardless of whether the system's current power consumption and/or operating temperature might allow the logic core to operating at a frequency higher than the specified maximum operating frequency.

In other embodiments, however, temperature control logic 210 may be configured to raise the operating frequency for a logic core regardless of whether the operating frequency and/or voltage for that logic had been previously reduced. Thus, in one embodiment, temperature control logic 210 may be configured to raise the operating frequency for a logic core above a specified maximum frequency if an operating temperature for the logic core is sufficiently low as to indicate that even after raising the operating frequency for the logic core the logic core may still operating at or below a maximum operating temperature. Thus, in some embodiments, temperature control logic 210 may the operating frequency of a processor above a specified maximum frequency if the processor is operating at a sufficiently low operating temperature. As noted above, when raising the operating frequency for a logic core, temperature control logic 210 may also raise the operating voltage for the logic core in order to support the higher operating frequency.

Thus, power management logic 200 may determine a new frequency for a logic core, as indicated by block 410. Power management logic 200, which may be implemented in hardware, firmware, software, or a combination thereof, may determine a new operating frequency for a logic core, such as based upon a standard algorithm or from a look up table containing various operating frequencies. After determining a new operating frequency for a logic core, power management logic 200 may determine whether the new frequency is compatible with the current operating voltage for the logic core, as indicated by decision block 420. For instance, if the new frequency is higher than the current operating frequency, the current voltage for the logic core may not be able to support the new frequency. If the new frequency is not compatible with the current operating voltage, power management logic 200 may determine a new voltage that is compatible with the new frequency, as indicated by block 430. As when determining a new frequency, power management logic 200 may determine a new operating voltage using various methods, such as an algorithm or a look up table of compatible pairs of voltage and frequencies, according to various embodiments. After determining a new operating voltage that is compatible with the new frequency, power management logic 440 may set the new voltage as the operating voltage for the logic core, as indicated by block 440.

If the new frequency is compatible with the current operating voltage for the logic core, or after adjusting the operating voltage for the logic core to a voltage that is compatible with the new frequency, power management logic 200 may set the new frequency as the operating frequency for the logic core, as indicated by block 450. In some embodiments, power management logic 200 may set a new operating voltage, if required, before setting an operating frequency. In other embodiments, however, power management logic 200 may set the new operating voltage and new operating frequency at the same time or may, in some embodiments, set a new operating frequency before setting the new operating voltage.

As described above, a logic core may, in some embodiments, be configured to communicate with common bridge logic 110, such as a Northbridge, that may be operating at a different frequency that the new frequency for the logic core. Thus, in some embodiments, power management logic 200 may be configured to adjust such common bridge logic 110 for the new operating frequency of the logic core, as illustrated in block 460, to maintain the communication between the logic core and the common bridge logic. For example, in one embodiment, power management logic 200 may be configured to adjust the common bridge logic 110 to operate at the new operating frequency for the logic core. However, in other embodiments, power management logic 200 may adjust common bridge logic 110 to operate at a frequency compatible with the new operating frequency for the logic core.

For example, the common bridge logic 110 may be adjusted to operate at a higher frequency than the new operating frequency for the logic core and the common bridge logic may include communication protocol logic 320 configured to communicate with the logic core using a divided or stepped down version of the higher operating frequency of the common bridge logic. In other embodiments, communication protocol logic 320 may be configured to ensure that the timings of each communication or signal between the logic core and the common bridge logic are such that they take into account a difference in the operating frequencies of the logic core and the common bridge logic. Thus, power management logic 200 may be configured to adjust common bridge logic 110 in response to the new operating frequency of a logic core in any of various ways, such as by adjusting the overall operating frequency for the common bridge logic, by adjusting communication protocol logic to account for differences between the operating frequency of the common bridge logic and the operating frequency for the logic core, or by performing a combination of both, according to various embodiments. When adjusting common bridge logic 110 in response to a new operating frequency for a logic core, power management logic 200 may also take into account the operating frequencies of other logic cores with which common bridge logic 110 may be communicating. Additionally, power management logic 200 may also adjust the operating voltage for common bridge logic 110 to be compatible with a new operating frequency for common bridge logic 110 or in response to having set a new operating voltage for a logic core.

Please note that while FIG. 4 is described above mainly in reference to power management logic controlling the operating frequency and voltage for a logic core, in some embodiment, temperature control logic may also control the operating frequency and voltage for a logic core. Additionally, in other embodiments, the steps described above regarding FIG. 4 may be performed in a different order, or with additional or fewer steps, than described above.

Figure 5:
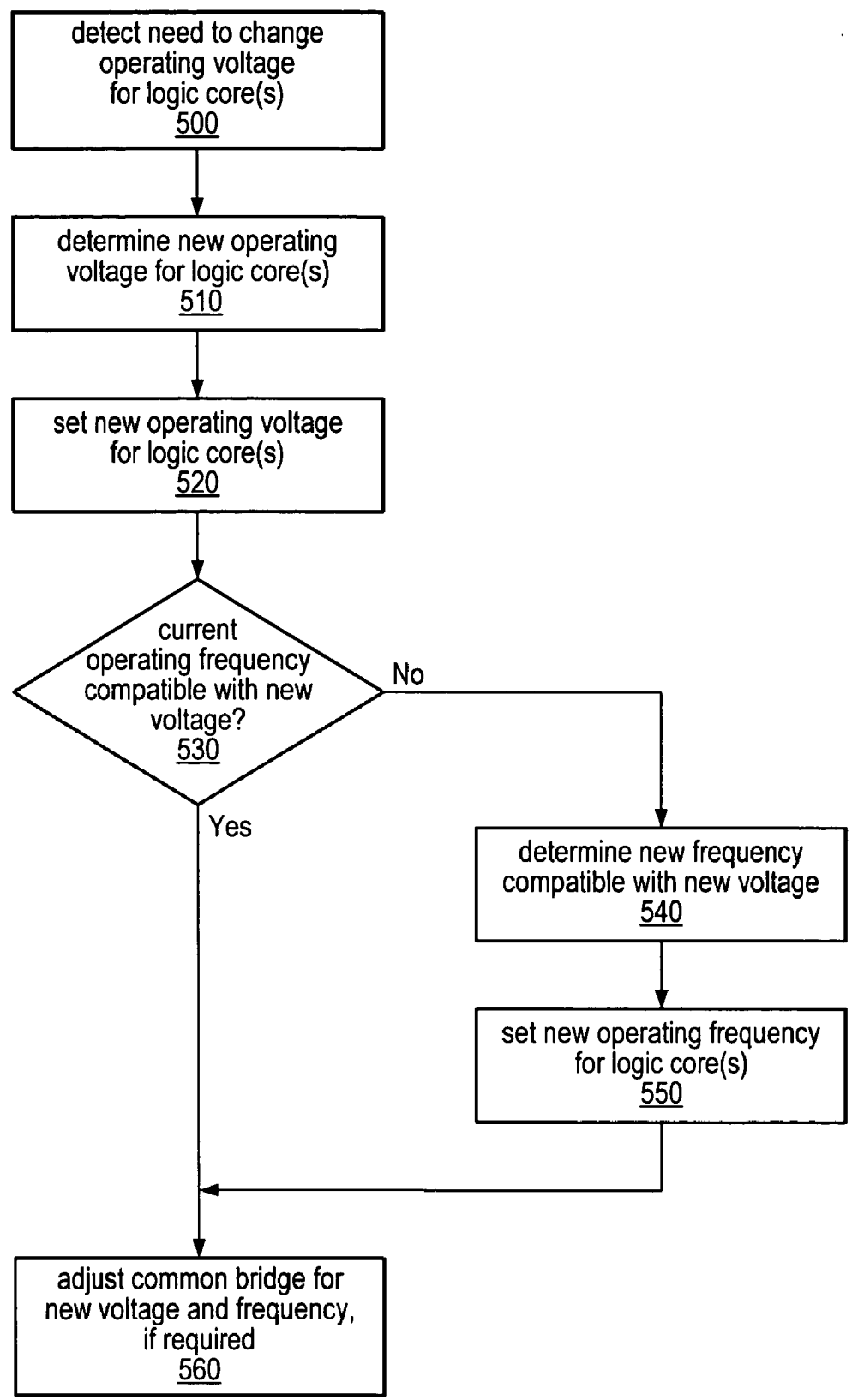
FIG. 5 is a flowchart illustrating one embodiment of a method for independently adjusting the operating voltage for logic cores of a multi-core integrated circuit.

While FIG. 4 illustrates a flowchart for a method of adjusting the operating frequency of a logic core, FIG. 5 is a flowchart illustrated one embodiment of a method for adjusting the operating voltage of a logic core. Thus, a system may detect a need to change the operating voltage for one or more logic cores, as indicated by block 500. As noted above regarding FIG. 4, a system may include power management logic 200 configured to monitor and adjust the power consumption and usage for the system. Thus, in some embodiments, power management logic 200 may determine that the operating voltage for one or more logic cores, such as in logic cores 120 of multi-core integrated circuit 100. For example, power management logic 200 may determine that the system is operating on battery power and may reduce the operating voltage of one or more of the logic cores in order to reduce the overall power consumption of the system. Alternatively, power management logic 200 may be configured to raise the operating voltage for one or more logic cores in response to detecting that the system is no longer executing on battery power. Additionally, in some embodiments, power management logic 200 may be configured to reduce the operating voltage of logic core(s) in steps according to an estimate of how much battery power is remaining.

Alternatively, temperature control logic 210 may change the operating voltage of one or more logic cores 120 based on an operating temperature for the system, multi-core integrated circuit, or an individual logic core, according to various embodiments. For instance, as noted above, temperature control logic 210 may detect, such as via temperature sensor 220, that an operating temperature for integrated circuit 100 is higher than a preferred, maximum, or safe operating temperature and may reduce the operating voltage of one or more logic cores 120 of integrated circuit 110 in response. Additionally, temperature control logic 210 may be configured to raise the operating voltage of one or more logic cores 120 in response to detecting that the operating temperature for the logic cores 120, the integrated circuit 100 or the system as a whole, is sufficiently lower than a specified operating temperature. In other words, if temperature control logic 210 determines that there is enough difference between a current operating temperature and a specified maximum operating temperature, temperature control logic 210 may raise the current operating voltage for one or more logic cores. In some embodiments, temperature control logic 210 may be configured to raise the operating voltage for a single logic core is that logic core has a lower operating temperature than other logic cores.

In some embodiments, temperature control logic 210 may be configured to raise an operating voltage for a logic core only if the operating voltage for the logic core was reduced previously. For instance, the operating voltage for logic core 120A may, upon system startup, be initially set to a maximum operating voltage and temperature control logic 210 may only raise the operating voltage for logic core 120A if the operating voltage for logic core 120A has been lowered from the initial maximum voltage. Similarly, when raising the operating voltage for a logic core, power management logic 200 and/or temperature control logic 210 may be configured to only raise the operating voltage to a specified maximum voltage regardless of whether the system's current power consumption and/or operating temperature might allow the logic core to operating at a voltage higher than the specified maximum operating voltage.

In other embodiments, however, temperature control logic 210 may be configured to raise the operating voltage of a logic core regardless of whether or not the operating characteristics for that logic core had been previously lowered. In some embodiments, temperature control logic 120 may be configured to raise the operating voltage for a logic core above a specified maximum operating voltage. For example, if a logic core of an integrated circuit is operating at an operating temperature below a specified maximum operating temperature while operating at a specified maximum operating voltage, temperature control logic 210 may be configured to raise the operating voltage for the logic core above the specified maximum operating voltage.

Thus, after detecting a need to change the operating voltage for one or more logic cores, power management logic 200 or temperature control logic 210 may be configured to determine a new operating voltage for the logic core(s), as indicated by block 510. In some embodiments, the new operating voltage may be determined via a voltage determining algorithm designed to determine a new operating voltage based upon current operating conditions for the system, such as current operating temperature, current power availability or current power consumption. Alternatively, in some embodiments, a new operating voltage for a logic core may be determined based upon a fixed table of operating voltages. In some embodiments, the new operating voltage may be selected to maintain a current operating frequency, while in other embodiments the new voltage may be selected without regard to the current operating frequency.

After determining a new operating voltage for one or more logic cores, power management logic 200 or temperature control logic 200 may set the new voltage as the operating voltage for the logic core(s), as indicated by block 520. When setting new operating voltages for more than one logic core, in some embodiments, power management logic 200 (or temperature control logic 210) may determine and adjust the operating voltage for each logic core separately. In other embodiments, however, the logic cores may all be set to use the same new voltage.

In some embodiments, power management logic 200 or temperature control logic 210 may determine whether the current operating frequency for the logic core(s) is compatible with the new operating voltage, as indicated by decision block 530. Thus, in some embodiments a new operating frequency may be determined and the operating voltage may be adjusted based on the new frequency, while in other embodiments a new operating voltage may be determined and the operating frequency adjusted accordingly. Thus, if a current operating frequency for a logic core is not compatible with a new voltage, a new frequency may be determined (or selected) that is compatible with the new voltage, as indicated by block 540. For instance, in one embodiment, power management logic 200 may reduce the operating voltage of one or multiple logic cores to reduce power consumption, and may also reduce the operating frequency to be compatible with the new operating voltage.

Similarly, in other embodiments, temperature control logic 210 may reduce the operating voltage for a logic core, or multiple logic cores, to reduce operating temperature and may also reduce the operating frequency accordingly. Additionally, power management logic 200 may be configured to increase the operating voltage for a logic core to take advantage of increase power availability, such as when a system is switched to wall power from battery power, and may also increase the operating frequency to a higher frequency compatible with a new, higher, operating voltage. Similarly, temperature control logic 210 may set a new operating frequency for a logic core to take advantage of a new, higher, operating voltage, such as when adjusting the operating voltage of a logic core in response to determining that an operating temperature is lower than a specified maximum operating temperature.

After determining a new frequency that is compatible with the new operating voltage, power management logic 200 (or temperature control logic 210) may set the new frequency as the operating frequency for the logic core(s), as indicated by block 550. As noted above, regarding FIG. 4, a new operating voltage may be set before setting a new operating frequency in some embodiments, while in other embodiments, a new operating voltage and a new operating frequency may be set at the same time. In yet other embodiments, the new operating frequency may be set before the new operating voltage. As noted previously, when setting a new operating voltage and/or frequency, the logic core and/or the entire integrated circuit may not operate during a transition period between the old and new operating characteristics. Thus, in some embodiments, a logic core may be configured to save a current state for all current operations before changing to the new operating characteristics. In other embodiments, the logic core may not save any current state, but may simply resume processing at the new operating characteristics, perhaps after a brief transition period.

As described above, in some embodiments common bridge logic 110 may also be adjusted to operate according to the new operating voltage and/or frequency of the logic core, as indicated by block 560. For example, common bridge logic 110 may be adjusted to operate at a new voltage and/or frequency compatible with the new operating characteristics (voltage and frequency) of the logic cores. Alternatively, voltage translation logic located at the interface between a logic core 120 and common bridge logic 110 may be adjusted to properly translate between the voltage levels of common bridge logic 110 and the logic core. Similarly, in some embodiments, protocol logic, such as common protocol logic 320A, of common bridge logic 110 may be adjusted to take into account the new operating characteristics of a logic core when communicating with that logic core, such as by ensuring that the timings used in a communications protocol between the common bridge logic and the logic core are appropriate to take into account a difference between the two operating frequencies.

Figure 6:
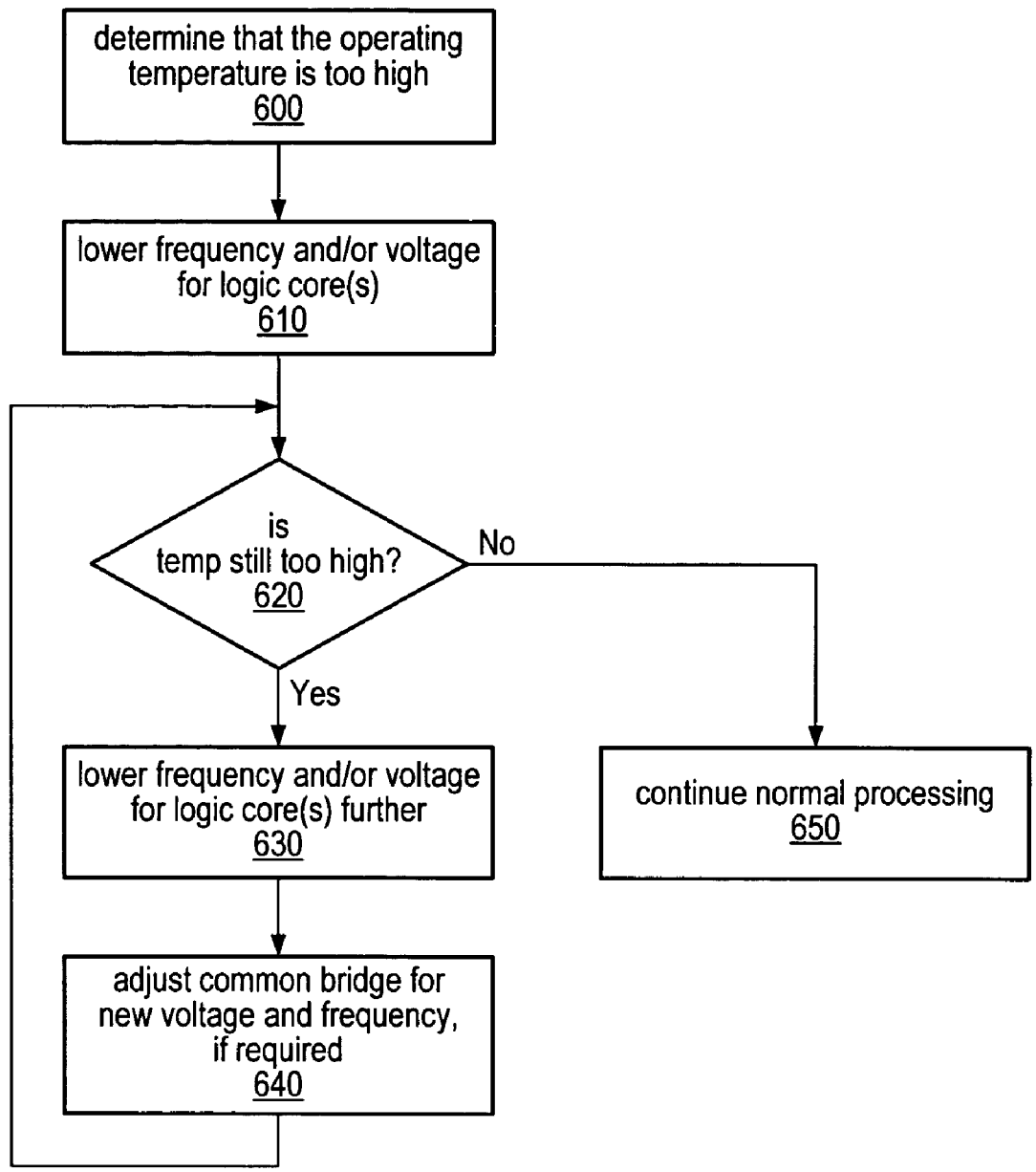
FIG. 6 is a flowchart illustrating one embodiment of a method for reducing the operating temperature of a multi-core integrated circuit via independently adjusting the operating voltage and/or frequency for the logic cores of the integrated circuit.

While FIGS. 4 and 5, described above, illustrate methods for making single adjustments to the operating characteristics for one or more logic cores of a multi-core integrated circuit, FIG. 6 is a flowchart illustrating one embodiment of a method for reducing the operating characteristics for one or more logic cores in steps or stages. For example, in one embodiment, temperature control logic, such as temperature control logic 210, may be configured to monitor the operating temperature of integrated circuit 100 and may determine that the current operating temperature of integrated circuit 100 is higher than a specified operating temperature, as indicated by block 600. Alternatively, in some embodiments, temperature control logic 210 may compare a current operating temperature, such as obtained via temperature sensor 220, with a maximum safe operating temperature, above which integrated circuit 100 may not operate reliably or may suffer damage. As noted above, in some embodiments, temperature control logic 210 may monitor a single operating temperature for integrated circuit 100, while in other embodiments, temperature control logic 210 may monitor multiple, individual operating temperature corresponding to individual logic cores or areas of integrated circuit 100.

After determining that an operating temperature (for either the entire integrated circuit or of one or more individual logic cores) is too high, temperature control logic 210 may lower the operating frequency and/or voltage for one or more logic cores 120 of integrated circuit 100, as indicated by block 610. As noted above, regarding FIGS. 4 and 5, temperature control logic 210 may first determine a new operating frequency and then adjust the operating voltage accordingly. Or alternatively, in other embodiments, temperature control logic 210 may first determine a new operating voltage and then adjust the operating frequency. In some embodiments, temperature control logic 210 may lower the operating frequency for multiple logic cores in order to reduce the overall operating temperature for integrated circuit 100. In other embodiments, however, temperature control logic 210 may be configured to reduce the operating frequency and/or voltage for a single logic core initially when attempting to reduce the overall operating temperature for the integrated circuit 100.

After reducing the operating characteristics (i.e. voltage and/or frequency) for one or more logic cores 120 of integrated circuit 100, temperature control logic 210 may be configured to verify that the operating temperature lowers is response to the lower operating characteristics. Thus, temperature control logic 210 may monitor the operating temperature, such as via temperature sensor 220, to determine whether the operating temperature for integrated circuit 100, or for one or more individual logic cores, is still too high, as indicated by decision block 620. In other words, after making an initial adjustment to the operating characteristics of one or more logic cores 120, temperature control logic 210 may verify that the operating temperature was lowered to a level lower than a specified maximum operating temperature. In some embodiments, temperature control logic 210 may be configured to wait a certain amount of time to allow the operating temperature to settle after adjusting the operating characteristics for one or more logic cores before determining whether or not the operating temperature was reduced enough.

If, after reducing the operating characteristics for one or more logic cores of an integrated circuit the operating temperature for the integrated circuit, or for one or more of the logic cores, does not lower enough, temperature control logic 210 may lower the operating frequency and/or voltage for the logic core(s) further, as indicated by block 630. For example, temperature control logic 210 may initially reduce the operating characteristics (i.e. frequency and/or voltage) for multiple logic cores 120 by a certain amount and may subsequently lower the operating characteristics for the logic cores even further, as indicated by block 640. For instance, in one embodiment, temperature control logic 210 may initially lower the operating frequency for multiple logic cores 120 by half, but if after that the operating temperature for integrated circuit 100 remains higher than a specified maximum operating temperature, temperature control logic 210 may reduce the operating frequency still further, such as to one forth of the original value. Similarly, temperature control logic 210 may initially reduce the operating voltage by half and then subsequently reduce it even further. In another embodiment, temperature control logic 210 may initially reduce the operating characteristics for a single logic core, such as logic core 120A, in order to reduce the overall operating temperature of integrated circuit 100. If the operating temperature for integrated circuit 100 does not lower sufficiently (e.g. to a level lower than a specified maximum value), temperature control logic 210 may then lower the operating characteristics for one or more additionally logic cores of integrated circuit 100.

In some embodiments, the operating frequency and/or voltage of a single logic core may be reduced through various stages until reaching some minimum level and then the operating frequency and/or voltage of one or more other logic cores may be adjusted through those same stages until the operating temperature of integrated circuit 100 is reduced to a level at or below a specified maximum operating temperature. Alternatively, in other embodiments, the operating frequencies and voltages for multiple logic cores 120 may be reduced together (i.e. in parallel) through a various levels or stages, until the operating temperature for integrated circuit 100 is reduced enough.

In some embodiments, temperature control logic 210 may be configured to determine how many logic cores for which to adjust the operating characteristics based upon how much the operating temperature for integrated circuit 100 needs to be lowered. Thus, if the current operating temperature for integrated circuit 100 is sufficiently close to or higher than a specified maximum operating temperature, temperature control logic 210 may adjust the operating characteristics of multiple (or all) of the logic cores in integrated circuit 100. If, however, the current operating temperature for integrated circuit 100 is approaching or at a specified maximum operating temperature, temperature control logic 210 may adjust the operating characteristics of a fewer number of logic cores or of only a single logic core in integrated circuit 100.

Thus, temperature control logic 210 may reduce the operating characteristics for logic cores in steps or stages according to various methods, in different embodiments. In some embodiments, temperature control logic 210 may reduce the operating characteristics for multiple logic cores in parallel to various frequencies and/or voltages, while, in other embodiments, temperature control logic 210 may reduce the operating characteristics of individual logic cores independently and in turn. If, after adjusting the operating characteristics of one or more logic cores, either initially or multiple times, the current operating temperature for integrated circuit 100 is still not too high, as indicated by the negative output of decision block 620, temperature control logic 210 may continue normal processing, as indicated by block 650, which may include continuing to monitor the operating temperature of integrated circuit 100.

While the method illustrated by FIG. 6 is described above regarding reducing the operating characteristics of one or more logic cores for temperature control purposes, in other embodiments, the operating characteristics for logic cores may be adjusted for power management reasons. Thus, power management logic 200 may be configured to reduce the operating characteristics of one or more logic cores 120 in steps or stages in order to reduce the overall power consumption of integrated circuit 100, according to some embodiments. Similar to the method described above regarding temperature control, power management logic 200 may initially reduce the operating characteristics for a single logic core, continue to monitor the power consumption of integrated circuit 100, and subsequently may reduce the operating characteristics of additional logic cores to reduce the power consumption of integrated circuit 100 even further. Additionally, in some embodiments, power control logic 200 may be configured to reduce the operating characteristics for multiple logic cores 120 together and then subsequently reduce the operating characteristics for the same logic cores even further, if required or desired.

Figure 7:
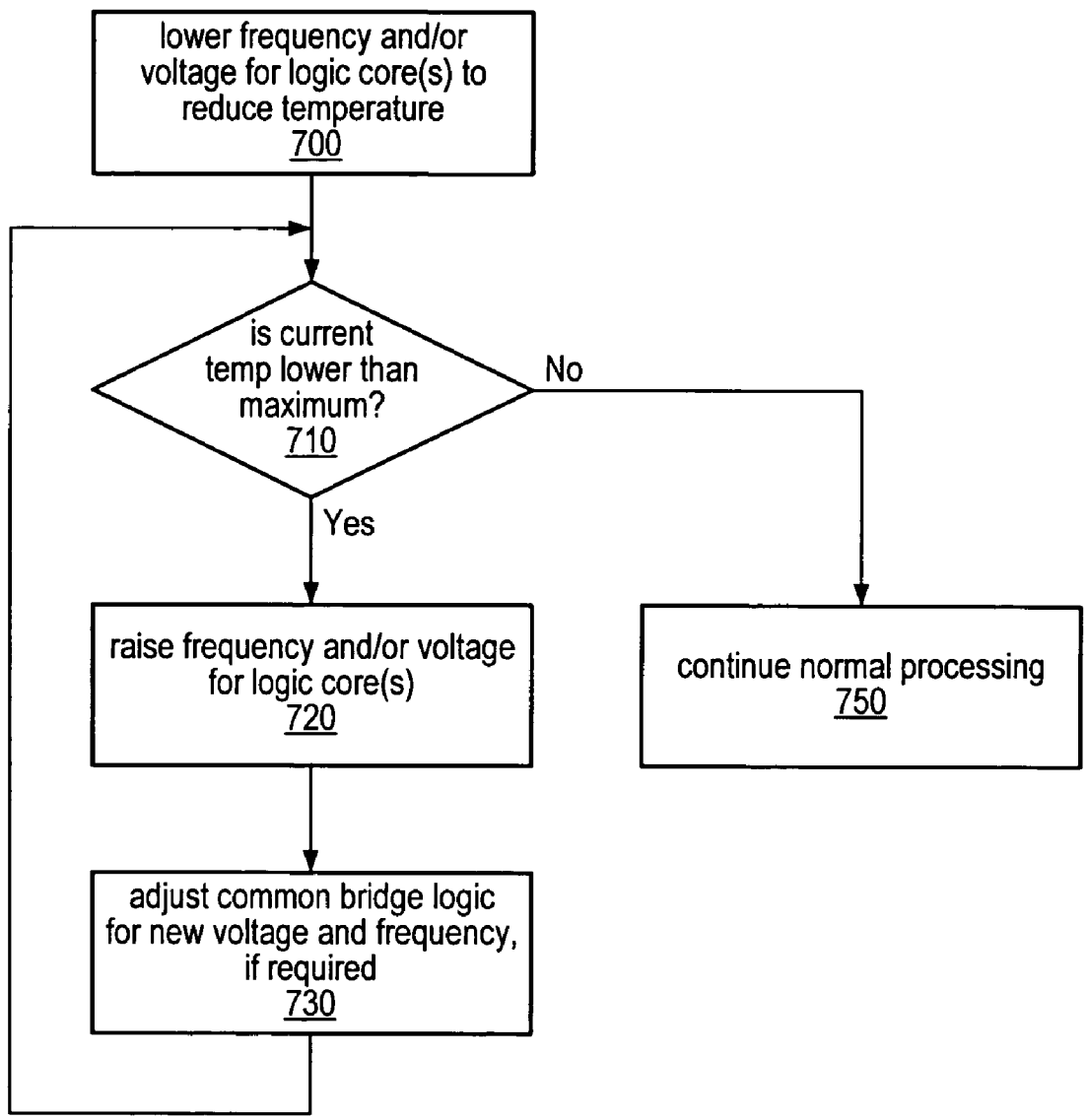
FIG. 7 is a flowchart illustrating one embodiment of a method for increasing the operating temperature of a multi-core integrated circuit via independently adjusting the operating voltage and/or frequency for the logic cores of the integrated circuit.

FIG. 7 is a flowchart illustrating one embodiment of a method for raising the frequency and/or voltage of one or more logic cores of a multi-core integrated circuit. For instance, after reducing the operating characteristics of one or more logic cores 120 of integrated circuit 100, such as for power management or temperature control, the operating characteristics may be subsequently adjusted upwards, such as in response to greater power availability or to take advantage of a difference between a current operating temperature and a specified maximum operating temperature, according to various embodiments. Thus, in some embodiments, temperature control logic 210 may lower the operating frequency and/or voltage for one or more logic cores 120, as indicated by block 700, in response to detecting that the operating temperature of integrated circuit 100 is greater than, or within some range of, a specified maximum operating temperature. Subsequently, temperature control logic 200, as part of continuing to monitor an operating temperature for integrated circuit 100, may determine whether the operating temperature for integrated circuit 100 is lower than a specified maximum, as indicated by decision block 710.

If, after adjusting the operating characteristics of one or more logic cores, either initially or multiple times, the current operating temperature for integrated circuit 100 is within a range of a specified maximum operating temperature, as indicated by the negative output of decision block 710, temperature control logic 210 may continue normal processing, as indicated by block 750, which may include continuing to monitor the operating temperature of integrated circuit 100. If, however, a current operating temperature is sufficiently lower than a specified maximum operating temperature, temperature control logic 210 may raise the operating frequency and/or voltage for one or more of the logic cores (for which the operating characteristics were previously lowered), as indicated by block 720. Additionally, in some embodiments, temperature control logic 210 may be configured to monitor the operating temperature of each logic core individually and may also be configured to adjust the operating characteristics for each logic core individually based on the individual operating temperature measurements. Thus, in some embodiments, temperature control logic 210 may lower the operating voltage and/or frequency for one logic core that may be operating too warmly, while raising the operating voltage and/or frequency for another logic core that has a lower operating temperature.

After raising the operating frequency and or voltage of one or more of the logic cores, temperature control logic 210 may also adjust common bridge logic 110 for compatibility with the new operating characteristics of the logic cores, as indicated by block 730. For example, common bridge logic 110 may be adjusted to operate at frequency at least at high as, and possible higher than, the new operating frequency for the logic cores. Additionally, communication protocol logic of common bridge logic 110 may be adjusted to take into account the new operating frequency of the logic cores. Furthermore, voltage translation logic between a logic core 120 and common bridge logic 110 may be adjusted to properly translate between voltage level(s) of common bridge logic 110 and the new operating voltage of logic core 120.

While the flowchart illustrated by FIG. 7 was described above regarding temperature control, similar methods may be employed for power management, in some embodiments. For instance, power management logic 200 may lower the operating characteristics for one or more logic cores to reduce the overall power consumption of integrated circuit 100, such as in response to the system switching to battery power and/or as part of general power conservation methods or techniques. Power management logic 200 may subsequently continue to monitor the power consumption of integrated circuit 100 and may also monitor the power availability to integrated circuit 100, such as whether the system is still operating on battery power, to determine whether to raise the operating characteristics of the logic cores to take advantage of current power availability. For example, after reducing the operating frequency and/or voltage for one or more logic cores in response to the system operating on battery power, power management logic 200 may detect that the system is no longer operating on battery power, but may be operating on wall power, and in response may raise the operating frequency and/or voltage of the logic cores, since reduced power consumption may no longer be required.

Figure 8:
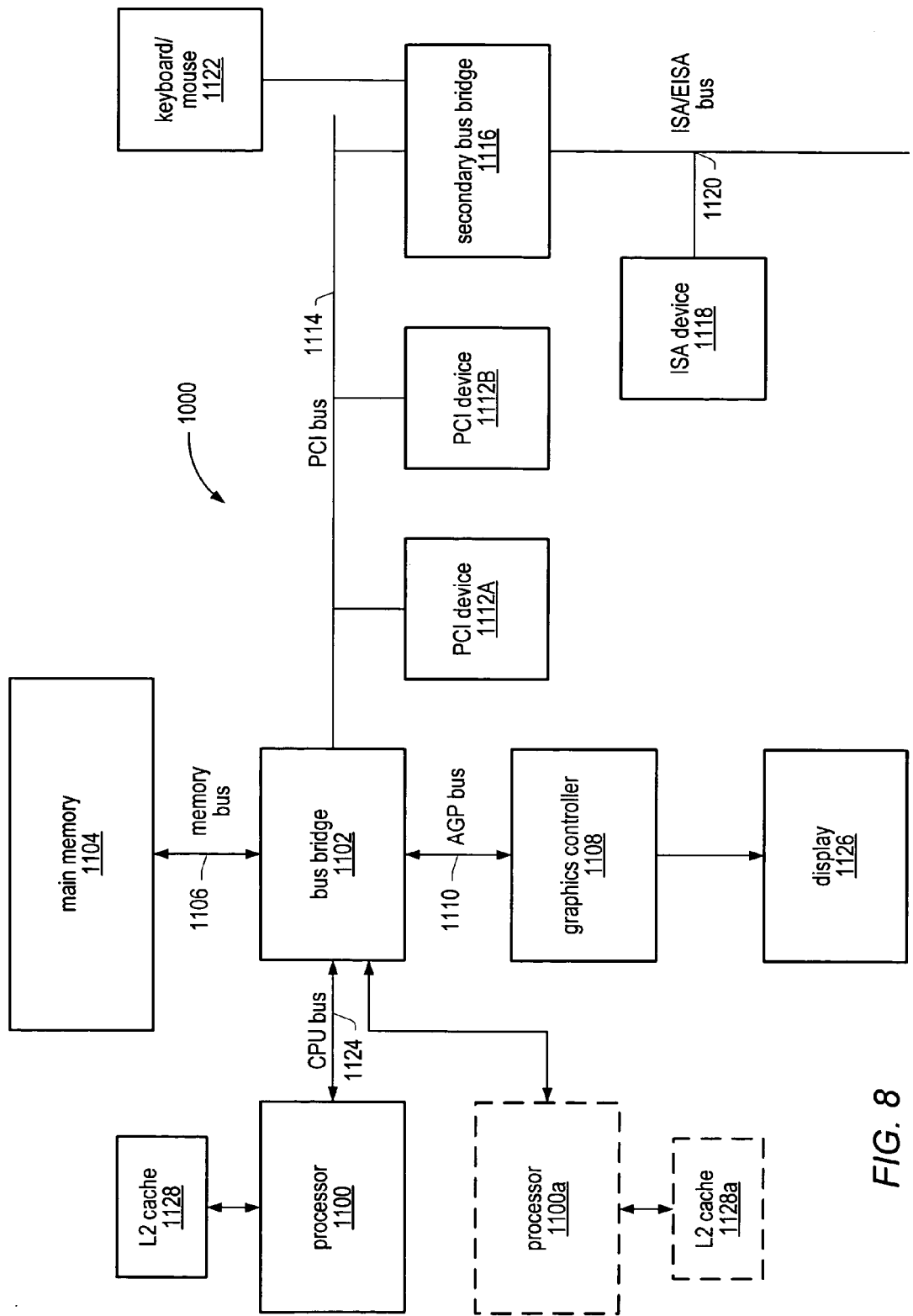
FIG. 8 is a block diagram illustrating one embodiment of a computer system capable of implementing independent adjustment of operating characteristics of logic cores of a multi-core integrated circuit.

FIG. 8 shows a block diagram of one embodiment of a computer system 1000 that includes a microprocessor 1100 coupled to a variety of system components through a Bus Bridge 402. Microprocessor 1100 may include multiple logic cores each of which may be configured to operate at voltages and/or frequencies independent of the voltages and/or frequencies at which others of the cores may operate, as described herein according to various embodiments. In some embodiments processor 1100 may include integrated circuit 100, one or more logic cores 120, common bridge logic 110, and/or one or more temperature sensors 220, described above. Additionally, system 1000 may include power management logic 200 and/or temperature control logic 210 both of which may be configured to control or adjust the operating frequency and/or voltage for logic core(s) 120, and possible common bridge logic 110, according to various embodiments, and as described herein.

Additionally, other components of system 1000 may include multiple logic cores that may be configured to operate at independent frequencies and/or voltages. For example, graphics controller 1108 may include one or more multi-core integrated circuits and each logic core within such an integrated circuit may be configured to operate at independent frequencies and/or voltages, as described herein. Similarly, secondary bus 1116, or any of PCI devices 1112 or ISA devices 1118 may also include multi-core integrated circuits or other components that are configured to operating at independent frequencies and/or voltages, as described herein.

Computer system 1000 and/or integrated circuit 100, described above, may be part of any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

In the depicted system, a main memory 1104 is coupled to Bus Bridge 1102 through a memory bus 1106, and a graphics controller 1108 is coupled to Bus Bridge 1102 through an AGP bus 1110. However, other embodiments of a computer system are possible and contemplated. Several PCI devices, such as PCI devices 1112A-1112B, may be coupled to Bus Bridge 1102 through a PCI bus 1114. A secondary Bus Bridge 1116 may also be provided to accommodate an electrical interface to one or more EISA or ISA devices 1118 through an EISA/ISA bus 1120. In the example illustrated in FIG. 8, microprocessor 1100 may be coupled to Bus Bridge 1102 through a CPU bus 1124 and may also be coupled to an optional L2 cache 1128, according to one embodiment. In some embodiments, the microprocessor 1100 may include an integrated L1 cache (not shown). Please note that in some embodiments, main memory 1104 may include program instructions configured to implement independently controlling the operating frequency and/or voltage of logic cores 120 and/or common bridge logic 110, as described herein.

Bus Bridge 1102 may provide an interface between microprocessor 1100, main memory 1104, graphics controller 1108, and devices attached to PCI bus 1114. When an operation is received from one of the devices connected to Bus Bridge 1102, Bus Bridge 1102 identifies the target of the operation (e.g., a particular device or, in the case of PCI bus 1114, that the target is on PCI bus 1114). Bus Bridge 1102 routes the operation to the targeted device. Bus Bridge 1102 generally translates an operation from the protocol used by the source device or bus to the protocol used by the target device or bus.

In addition to providing an interface to an ISA/EISA bus for PCI bus 1114, secondary Bus Bridge 1116 may incorporate additional functionality. An input/output controller (not shown), either external from or integrated with secondary Bus Bridge 1116, may also be included within computer system 1100 to provide operational support for a keyboard and mouse 1122 and for various serial and parallel ports. An external cache unit (not shown) may also be coupled to CPU bus 1124 between microprocessor 1100 and Bus Bridge 1102 in other embodiments. Alternatively, the external cache may be coupled to Bus Bridge 1102 and cache control logic for the external cache may be integrated into Bus Bridge 1102. L2 cache 1128 is shown in a backside configuration to microprocessor 1100. It is noted that L2 cache 1128 may be separate from microprocessor 1100, integrated into a cartridge (e.g., slot 1 or slot A) with microprocessor 1100, or even integrated onto a semiconductor substrate with microprocessor 1100.

Main memory 1104 may be a memory in which application programs are stored and from which microprocessor 1100 primarily executes. A suitable main memory 1104 may include DRAM (Dynamic Random Access Memory). For example, a plurality of banks of SDRAM (Synchronous DRAM) or Rambus DRAM (RDRAM) may be suitable.

PCI devices 1112A-1112B are illustrative of a variety of peripheral devices such as network interface cards, video accelerators, audio cards, hard or floppy disk drives or drive controllers, SCSI (Small Computer Systems Interface) adapters and telephony cards. Similarly, ISA device 1118 is illustrative of various types of peripheral devices, such as a modem, a sound card, and a variety of data acquisition cards such as GPIB or field bus interface cards.

Graphics controller 1108 is provided to control the rendering of text and images on a display 1126. Graphics controller 1108 may embody a typical graphics accelerator generally known in the art to render three-dimensional data structures that can be effectively shifted into and from main memory 1104. Graphics controller 1108 may therefore be a master of AGP bus 1110 in that it can request and receive access to a target interface within Bus Bridge 1102 to thereby obtain access to main memory 1104. A dedicated graphics bus accommodates rapid retrieval of data from main memory 1104. For certain operations, graphics controller 1108 may further be configured to generate PCI protocol transactions on AGP bus 1110. The AGP interface of Bus Bridge 1102 may thus include functionality to support both AGP protocol transactions as well as PCI protocol target and initiator transactions. Display 1126 is any electronic display upon which an image or text can be presented. A suitable display 1126 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 1000 may be a multi-processing computer system including additional microprocessors (e.g., microprocessor 1100a shown as an optional component of computer system 1000). Microprocessor 1100a may be similar to microprocessor 1100. More particularly, microprocessor 1100a may be an identical copy of microprocessor 1100 in one embodiment. Microprocessor 1100a may be connected to Bus Bridge 1102 via an independent bus or may share CPU bus 1124 with microprocessor 1100. Furthermore, microprocessor 1100a may be coupled to an optional L2 cache 1128a similar to L2 cache 1128.

As used herein, the terms "clock cycle" or "cycle" refer to an interval of time in which the various stages of the instruction processing pipelines complete their tasks. Instructions and computed values are captured by memory elements (such as registers or arrays) according to a clock signal defining the clock cycle. For example, a memory element may capture a value according to the rising or falling edge of the clock signal.

Numerous variations and modifications will become apparent to those skilled in the art once the above disclosure is fully appreciated. It is intended that the following claims be interpreted to embrace all such variations and modifications.

What is claimed is:

1. An integrated circuit, comprising:
   a plurality of logic cores, wherein at least one of the plurality of logic cores is configured to operate at a voltage level independent of a voltage level at which another of the plurality of logic cores operates, and wherein at least one of the logic cores is configured to operate at a frequency independent of a frequency at which another of the plurality of logic cores operates;
   a common interface unit, wherein the common interface unit is configured to provide an interface between the plurality of logic cores and one or more components external to the integrated circuit, wherein during operation the common interface unit is configured to communicate with ones of the plurality of logic cores operating at different voltage levels and ones of the logic cores operating at different frequencies; and
   power management logic configured to:
      adjust a current operating voltage level to a new operating voltage level for at least one of the plurality of logic cores; and
      detect an incompatibility between the new operating voltage and a current operating frequency of the at least one of the plurality of logic cores and, in response to said detecting, determine a compatible operating frequency for the at least one of the plurality of logic cores.

2. The integrated circuit of claim 1, wherein the power management logic is further configured to adjust a current operating voltage level for at least one of the plurality of logic cores in response to determining that a current operating temperature for the integrated circuit is hotter than a specified temperature.

3. The integrated circuit of claim 2, further comprising one or more temperature sensors configured to determine a current operating temperature for the integrated circuit.

4. The integrated circuit of claim 3, wherein the power management logic is configured to determine a current operating temperature for the integrated circuit according to at least one of the one or more temperature sensors.

5. The integrated circuit of claim 3, wherein to determine a current operating temperature for the integrated circuit at least one of the one or more temperature sensors is configured to determine a current operating temperature for a specific one of the plurality of logic cores.

6. The integrated circuit of claim 2, further comprising a voltage regulator configured to supply a plurality of voltages to the at least one of the plurality of logic cores, wherein to adjust a current operating voltage the power management logic is configured to send control signals to the voltage regulator requesting the voltage regulator to supply a lower voltage to the at least one of the plurality of logic cores, wherein the lower voltage is lower than a current operating voltage for the at least one of the plurality of logic cores.

7. The integrated circuit of claim 2, wherein in further response to determining that a current operating temperature for the integrated circuit is hotter than a specified temperature, the power management logic is configured to adjust an operating voltage for the common interface unit to an adjusted voltage, wherein the adjusted voltage is lower than a current operating voltage for the common interface unit.

8. The integrated circuit of claim 2, wherein the power management logic is further configured to adjust an operating frequency for at least one of the plurality of logic cores in response to determining that a current operating temperature for the integrated circuit is hotter than a specified temperature for the integrated circuit.

9. The integrated circuit of claim 8, wherein the power management logic is further configured to adjust an operating frequency for the common interface unit to an adjusted frequency, wherein the adjusted frequency is equal to or greater than the adjusted operating frequency of the at least one of the plurality of logic cores.

10. The integrated circuit of claim 1, wherein each of the logic cores is a processor core configured to execute program instructions.

11. The integrated circuit of claim 1, wherein the common interface unit is a common bridge unit configured to bridge between the plurality of logic cores and one or more communication interfaces configured for communicating with one or more components external to the integrated circuit.

12. The integrated circuit of claim 11, wherein the common bridge unit is a Northbridge unit.

13. The integrated circuit of claim 1, further comprising frequency control logic configured to adjust an operating frequency of at least one of the plurality of logic cores in response to determining that a current operating temperature for the integrated circuit is hotter than a specified temperature for the integrated circuit.

14. The integrated circuit of claim 13, farther comprising a frequency generator configured to supply a frequency signal to the at least one of the plurality of logic cores, wherein to adjust the operating frequency of the at least one of the plurality of logic cores, the frequency control logic is configured to request that the frequency generator to supply a lower frequency signal to the at least one of the plurality of logic cores, wherein the lower frequency is lower than a current frequency for the at least one of the plurality of logic cores.

15. The integrated circuit of claim 1, further comprising voltage translation logic located at an interface between the at least one of the plurality of logic cores and the common interface unit, wherein the voltage translation logic is configured to translate communication signals from a voltage level at which the common interface unit is operating to a voltage level at which the at least one of the logic cores is operating.

16. The integrated circuit of claim 1, further comprising frequency control logic configured to increase an operating frequency of at least one of the plurality of logic cores in response determining that a current operating temperature for the integrated circuit is cooler than a specified temperature for the integrated circuit.

17. A method, comprising:
    determining that a current operating temperature for an integrated circuit is hotter than a specified temperature, wherein the integrated circuit comprises a plurality of logic cores, wherein each of the logic cores is configured to operate at a voltage independent of a voltage at which another of the logic cores operates, and wherein each of the logic cores is configured to operate at a frequency independent of a frequency at which another of the logic cores operates;
    determining a subset of the plurality of logic cores, wherein a size of the subset is selected dependent upon a difference between the specified temperature and the current operating temperature for the integrated circuit, wherein the size of the subset is greater than one and less than all of the plurality of logic cores; and
    supplying a lower operating voltage for the subset of logic cores, wherein the lower operating voltage is lower than a current operating voltage for the subset of logic cores.

18. The method of claim 17, further comprising:
    determining whether an incompatibility exists between the lower operating voltage and a current operating frequency for the subset of logic cores; and
    in response to said determining:
        supplying a lower frequency to the subset of logic cores if the current operating frequency for the subset of logic cores is incompatible with the lower operating voltage; and
        maintaining the current operating frequency for the subset of logic cores if the current operating frequency is not incompatible with the lower operating voltage.

19. The method of claim 17, further comprising supplying a lower voltage to a common interface unit coupled to the subset of logic cores, wherein the common interface unit is configured to interface to the subset of logic cores and to interface to one or more components external to the integrated circuit.

20. The method of claim 19, further comprising, if a current operating frequency for the common interface unit is incompatible with the lower voltage, supplying a lower frequency to the common interface unit, wherein the lower frequency is lower than the current operating frequency.

21. A method, comprising:
    determining that a current operating temperature for an integrated circuit is hotter than a specified temperature, wherein the integrated circuit comprises a plurality of logic cores, wherein each of the logic cores is configured to operate at a voltage independent of a voltage at which another of the logic cores operates, and wherein each of the logic cores is configured to operate at a frequency independent of a frequency at which another of the logic cores operates; and
    determining a subset of the plurality of logic cores, wherein a size of the subset is selected dependent upon a difference between the specified temperature and the current operating temperature for the integrated circuit, wherein the size of the subset is greater than one and less than all of the plurality of logic cores; and
    supplying a lower operating frequency for the subset of logic cores, wherein the lower operating frequency is lower than a current operating frequency for the subset of logic cores.

22. The method of claim 21, further comprising:
    determining whether an incompatibility exists between the lower operating frequency and a current operating voltage for the subset of logic cores; and
    in response to said determining:
        supplying a lower voltage to the subset of logic cores if the current operating voltage for the subset of logic cores is incompatible with the lower operating frequency; and
        maintaining the current operating voltage for the subset of logic cores if the current operating voltage is not incompatible with the lower operating frequency.

23. The method of claim 21, further comprising supplying a lower frequency to a common interface unit coupled to the subset of logic cores, wherein the common interface unit is configured to interface to the subset of logic cores and to interface to one or more components external to the integrated circuit.

24. The method of claim 23, further comprising, if a current operating voltage for the common interface unit is incompatible with the lower frequency, supplying a lower voltage to the common interface unit, wherein the lower voltage is lower than the current operating voltage.

25. A computer system, comprising:
    a processor;
    memory coupled to the processor;
    wherein the processor comprises:
        a plurality of processor cores configured to execute program instructions, wherein each of the plurality of processor cores is configured to operate at a voltage independent of a respective voltage at which another of the plurality of processor cores is operating and wherein each of the plurality of processor cores is configured to operate at a frequency independent of a frequency at which another of the plurality of processor cores is operating;
        a common interface unit coupled to each of the processor cores;
        wherein the common interface unit is configured to interface to each of the processor cores and to one or more components external to the processor;
        wherein the common interface unit is configured to operate at a voltage different from each respective voltage at which the plurality of processor cores are operating; and
        wherein the common interface unit is configured to operate at a frequency different from each respective frequency at which the plurality of logic cores are operating; and
    power management logic configured to:
        adjust a current operating voltage level to a new operating voltage level for at least one of the plurality of logic cores; and
        detect an incompatibility between the new operating voltage and a current operating frequency of the at least one of the plurality of logic cores and, in response to said detecting, determine a compatible operating frequency for the at least one of the plurality of logic cores.

26. The computer system of claim 25, further comprising wherein the power management logic is configured to lower an operating voltage of at least one of the processor cores in response to determining that the processor is operating at a temperature warmer than a specified operating temperature.

27. The computer system of claim 26, wherein the power management logic is further configured to lower an operating frequency for the at least one of the logic cores in response to said detecting.

28. The computer system of claim 25, wherein the power management logic is configured to lower an operating frequency of at least one of the logic cores in response to determining that the processor is operating at an temperature warmer than a specified operating temperature.

29. The computer system of claim 28, wherein the power management logic is further configured to lower an operating voltage for the at least one of the logic cores in response to said detecting.

30. The computer system of claim 25, wherein the processor further comprises translation logic configured to translate one or more voltage levels for communication signals between the common interface unit and one of the plurality of logic cores if the common interface unit is operating at a voltage different than a voltage at which the one of the logic cores is operating.

31. A system, comprising:
    a plurality of processor cores configured to execute program instructions, wherein at least one of the plurality of processor cores is configured to operate at a voltage level independent of a voltage level at which another of the plurality of processor cores operates; and
    a common interface unit, wherein the common interface unit is configured to provide an interface between the plurality of processor cores and one or more components external to the integrated circuit, wherein during operation the common interface unit is configured to communicate with ones of the plurality of processor cores operating at different voltage levels, wherein the common interface unit is configured to operate at a voltage level different from each respective voltage level at which the plurality of processor cores are operating; and
    temperature control logic configured to:
        determine that a current operating temperature is hotter than a specified temperature;
        determine a subset of the plurality of processor cores, wherein a size of the subset is selected dependent upon a difference between the specified temperature and the current operating temperature, wherein the size of the subset is greater than one and less than all of the plurality of processor cores; and
        supply a lower operating voltage for the subset of processor cores, wherein the lower operating voltage is lower than a current operating voltage for the subset of processor cores.

32. A system, comprising:

a plurality of processor cores configured to execute program instructions, wherein at least one of the plurality of processor cores is configured to operate at a frequency independent of a frequency at which another of the plurality of processor cores operates; and a common interface unit, wherein the common interface unit is configured to provide an interface between the plurality of processor cores and one or more components external to the integrated circuit, wherein during operation the common interface unit is configured to communicate with ones of the plurality of processor cores operating at different frequencies, wherein the common interface unit is configured to operate at a frequency different from each respective frequency at which the plurality of processor cores are operating; and temperature control logic configured to:
    determine that a current operating temperature is hotter than a specified temperature; and
    determine a subset of the plurality of processor cores, wherein a size of the subset is selected dependent upon a difference between the specified temperature and the current operating temperature, wherein the size of the subset is greater than one and less than all of the plurality of processor cores; and
    supply a lower operating frequency for the subset of processor cores, wherein the lower operating frequency is lower than a current operating frequency for the subset of processor cores.

* * * * *

UNITED STATES PATENT AND TRADEMARK OFFICE
CERTIFICATE OF CORRECTION

| | | |
|---|---|---|
| PATENT NO. | : 7,263,457 B2 | Page 1 of 1 |
| APPLICATION NO. | : 11/325054 | |
| DATED | : August 28, 2007 | |
| INVENTOR(S) | : Scott A. White, William A. Hughes and Philip E. Madrid | |

It is certified that error appears in the above-identified patent and that said Letters Patent is hereby corrected as shown below:

In the Claims:

Claim 14, col. 28, line 1, after "of claim 13," please delete "farther" and insert --further-- in place thereof.

Claim 26, col. 30, line 15, please delete "further comprising".

Signed and Sealed this

Sixth Day of November, 2007

JON W. DUDAS
*Director of the United States Patent and Trademark Office*